US006692686B1

(12) United States Patent
Gonda et al.

(10) Patent No.: US 6,692,686 B1
(45) Date of Patent: Feb. 17, 2004

(54) BLOW MOLDING METHOD AND APPARATUS

(75) Inventors: Toshiaki Gonda, Yokohama (JP); Hideo Miura, Yokohama (JP); Hiroshi Noma, Yokosuka (JP); Takashi Miyazaki, Ichikawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 09/557,572

(22) Filed: Apr. 25, 2000

(30) Foreign Application Priority Data

Apr. 28, 1999 (JP) ............................. 11-123153
Apr. 28, 1999 (JP) ............................. 11-123155
Mar. 23, 2000 (JP) ............................ 2000-082469

(51) Int. Cl.[7] ........................ B29C 49/04; B29C 49/32
(52) U.S. Cl. ................. 264/542; 264/540; 425/532; 425/538; 425/541
(58) Field of Search ............... 425/538, 532, 425/541; 264/540, 542

(56) References Cited

U.S. PATENT DOCUMENTS

| 2,975,473 | A | * | 3/1961 | Hagen et al. | ............. | 264/527 |
| 3,396,427 | A | * | 8/1968 | Raspante | ............. | 425/163 |
| 3,576,048 | A | * | 4/1971 | Stanley | ............. | 425/541 |
| 3,998,576 | A | * | 12/1976 | Frohn et al. | ............. | 425/532 |
| 5,576,034 | A | * | 11/1996 | Kiefer et al. | ............. | 425/532 |
| 5,976,452 | A | * | 11/1999 | Meyer | ............. | 264/542 |

FOREIGN PATENT DOCUMENTS

| DE | 19528751 A1 | * | 10/1996 | ......... B29C/49/56 |
| EP | 913244 A1 | * | 5/1999 | ......... B29C/49/32 |
| GB | 2255929 A | * | 11/1992 | ......... B29C/49/04 |
| WO | WO 9828023 A1 | * | 7/1998 | ......... A61F/13/15 |
| WO | WO 01/23164 A1 | * | 9/2000 | |

* cited by examiner

Primary Examiner—Robert Davis
(74) Attorney, Agent, or Firm—Hedman & Costigan, P.C.

(57) ABSTRACT

A blow molding method includes steps of moving a split mold to a parison receiving position where a parison is supplied and receiving a parison, closing the split mold, performing blow molding at a blow molding position, and opening the split mold at a product discharge position and thereby discharging a product. The method further includes steps of: sequentially reciprocating each split mold in trains of split molds provided opposed to each other across the parison receiving position to and from a position opposed to the parison receiving position; and sequentially reciprocating the split mold disposed at the position where the split mold is opposed to the parsion receiving position to and from the parison receiving position for performing blow molding. There is also provided a blow molding apparatus for carrying out this molding method.

6 Claims, 21 Drawing Sheets

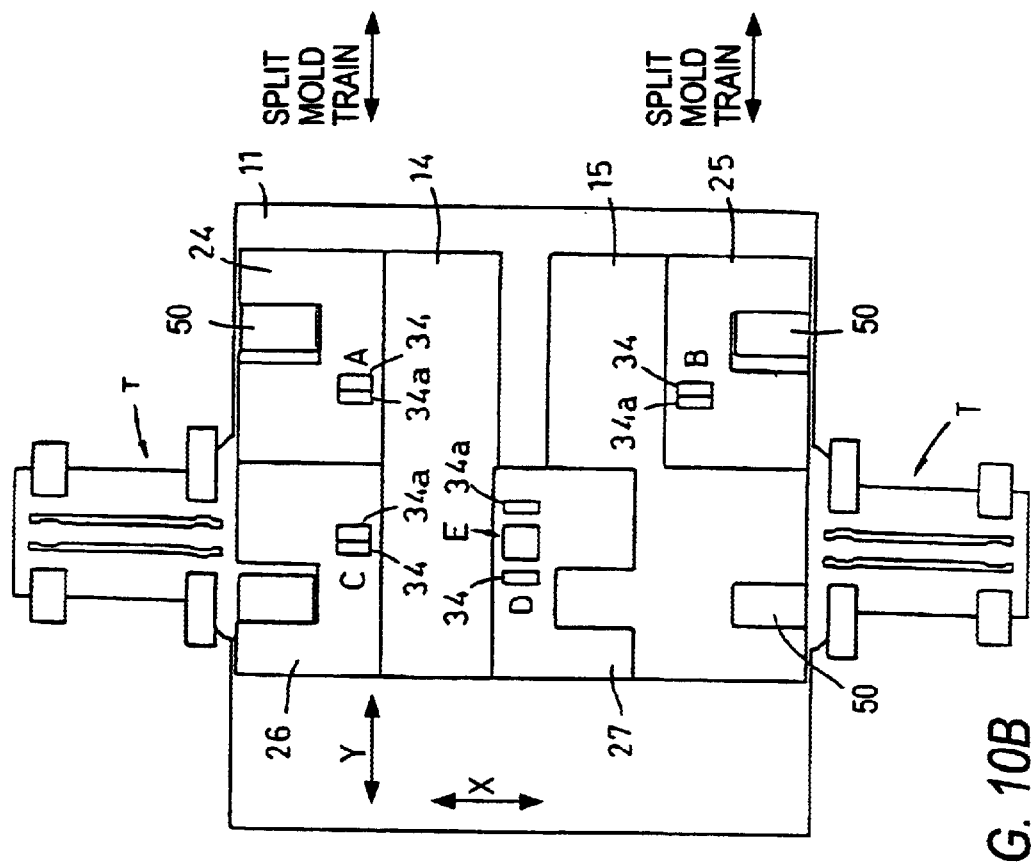
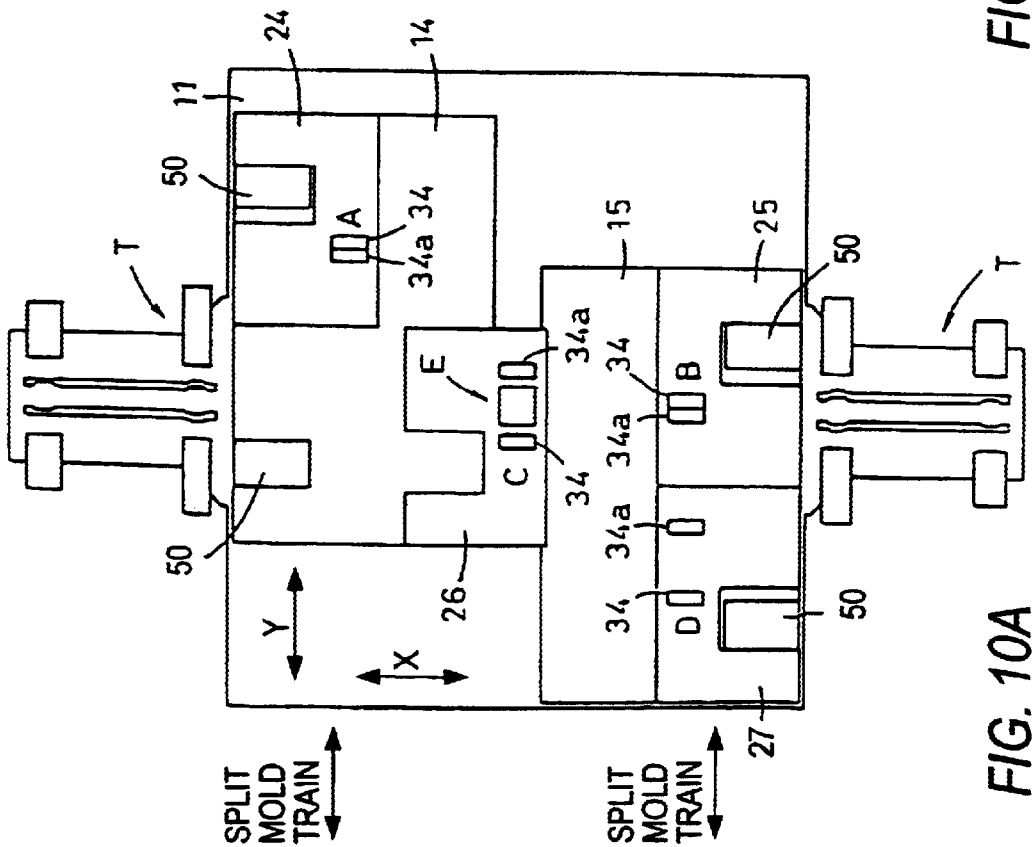
*FIG. 10A*
*FIG. 10B*

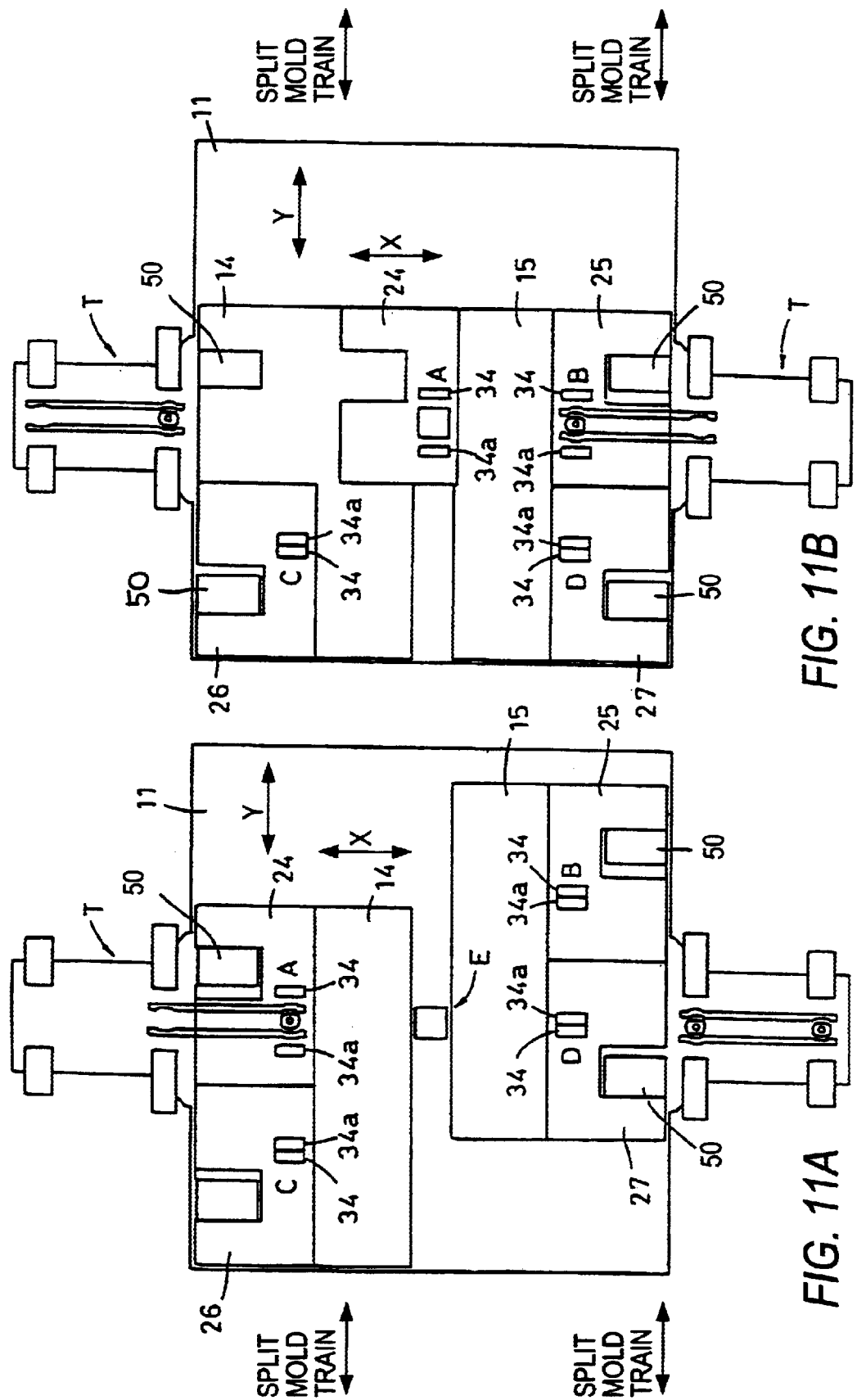

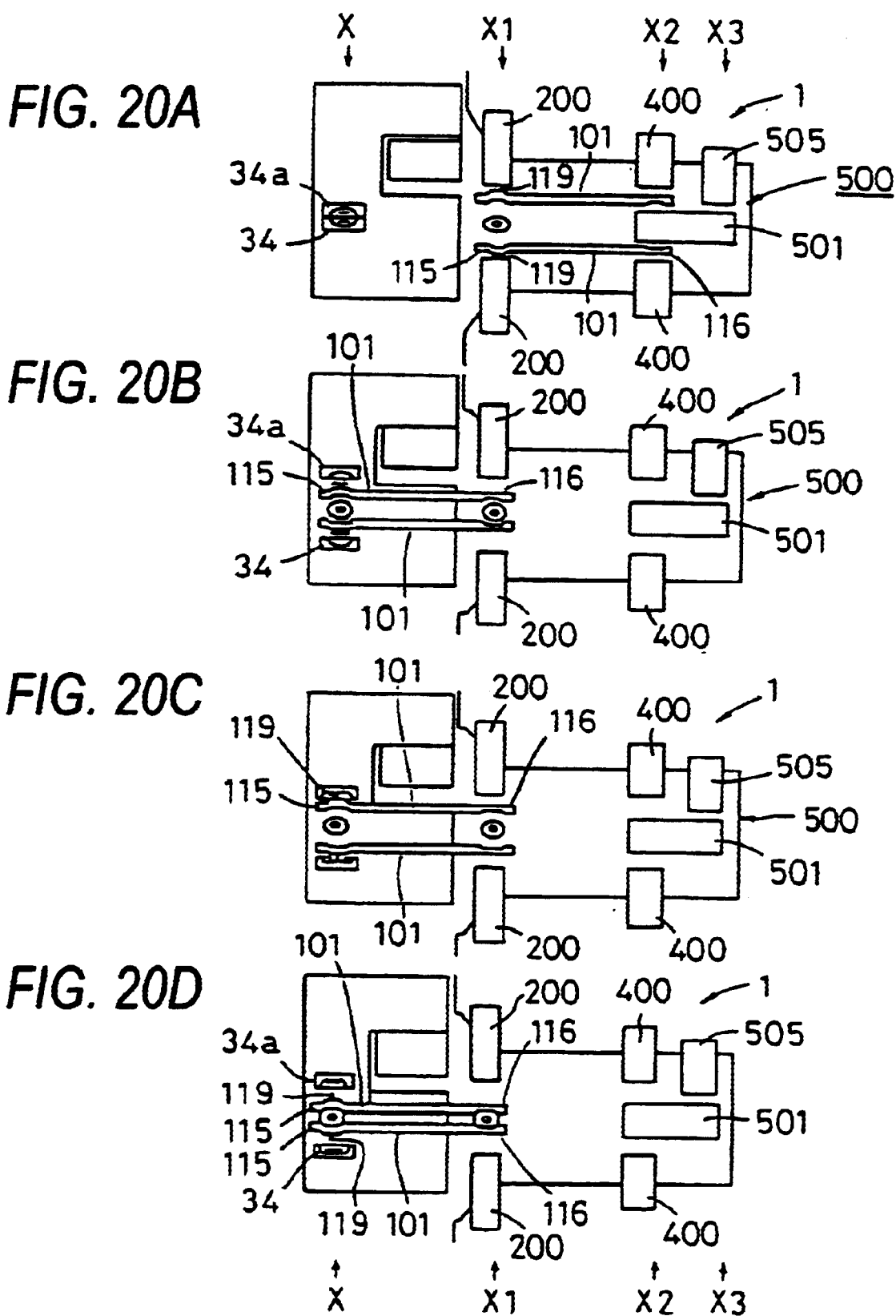

BLOW MOLDING METHOD AND APPARATUS

BACKGROUND OF THE INVENTION

This invention relates to a blow molding method and a blow molding apparatus which are capable of achieving blow molding efficiently with a relatively few molds, cooling blow molding products efficiently in a short period of time, performing a series of blow molding processes including takeout of products and attaching of labels to the molds efficiently, and coping with a variety of production styles ranging from a small scale production to a large scale production.

Blow molding is a popular method for forming hollow containers. In blow molding, a parison extruded from a die head is received by an opened pair of mold pieces of a split mold, the split mold is closed and air is blown into the parison and then the split mold is opened to take out a product.

Blow molding apparatuses for performing such blow molding are generally classified by a manner of moving of split molds into a rotary type blow molding apparatus in which split molds are moved in a circle and a shuttle type blow molding apparatus in which split molds are reciprocated linearly.

In the rotary type blow molding apparatus, split molds mounted on an annular rail are moved in a circle and are opened and closed continuously, whereby blow molding and delivery of a product are completed in one cycle of movement of each split mold on the annular rail.

In the shuttle type blow molding apparatus, two pairs of split molds which reciprocate linearly are provided and these split molds are alternately reciprocated for receiving parisons and for blow molding the parisons.

Accordingly, in a case where a single type of hollow container should be produced in a large scale, the rotary type blow molding apparatus may preferably be employed so that blow molding will be performed efficiently by using a relatively large number, for example 12 to 14, of split molds arranged in a circle.

The shuttle type blow molding apparatus which performs blow molding by alternate reciprocating movement of the two split molds is limited in its blow molding capacity even if the speed of reciprocating movement is increased and, for this reason, is not suitable for a large scale production but suitable for a small scale production.

In a case where a small scale production of various types of products is required for coping with requirement for various types of hollow containers, the rotary type blow molding apparatus has the disadvantage that split molds which are mounted on the apparatus in a set of 12 to 14 split molds must be changed and this takes much time and further it is costly to produce so many split molds.

The shuttle type blow molding apparatus is suitable for such small scale production of various types of products in that change of split molds does not take much time because the number of split molds used is small and the manufacturing cost of split molds is relatively small. The shuttle type blow molding apparatus, however, is limited in its blow molding capacity in a case where a large scale production is required.

There are many cases where a label must be attached to a product which has been produced by blow molding and, in such cases, a label is generally attached to a product simultaneously with performing of blow molding. For this purpose, a product is taken out of an opened split mold after blow molding by means of a product takeout robot and thereafter a label is attached to the split mold by means of a label attaching robot. Thus, two different robots are required and, since it takes a long cycle time for operating these robots, an efficient blow molding cannot be achieved.

Further, the cycle time of the operation of the robots is determined by speed of cooling in blow molding. Cooling of the inside of a parison is difficult when a label is attached so that improvement in efficiency in cooling is desired for.

Furthermore, a product taken out of a split mold generally has flash and, therefore, a step using a device for removing flash from the product becomes necessary for obtaining a final product by blow molding.

It is, therefore, an object of the invention to provide a blow molding method and a blow molding apparatus which are capable of performing blow molding efficiently with a relatively few split molds.

It is another object of the invention to provide a blow molding method and a blow molding apparatus which are capable of cooling a product efficiently in a short period of time.

It is another object of the invention to provide a blow molding method and a blow molding apparatus which are capable of efficiently performing a series of blow molding operations including taking out of a product and attaching of a label to a split mold.

It is still another object of the invention to provide a blow molding method and a blow molding apparatus which are capable of performing blow molding efficiently both in a small scale production and in a large scale production.

SUMMARY OF THE INVENTION

For achieving the above described objects of the invention, there is provided a blow molding method comprising steps of moving a split mold to a parison receiving position where a parison is supplied and receiving the parison, closing the split mold, performing blow molding at a blow molding position, and opening the split mold at a product discharging position and thereby discharging a product, said method further comprising steps of:

sequentially reciprocating each split mold in trains of split molds provided opposed to each other across the parison receiving position to and from a position opposed to the parison receiving position; and sequentially reciprocating the split mold between the position where the split mold is opposed to the parison receiving position and the parison receiving position for performing blow molding.

According to the invention, by combination of the two reciprocating movements, namely the reciprocating movement of the trains of split molds to and from the position opposed to the parison receiving position and the reciprocating movement of the split molds between the position opposed to the parison receiving position and the parison receiving position, blow molding can be performed efficiently with a smaller number of split molds and replacement of split molds can be finished in a shorter period of time than the blow molding using the rotary type blow molding apparatus.

In one aspect of the invention, the direction of reciprocation of each split mold in the trains of the split molds to and from the position opposed to the parison receiving position crosses, at right angle, the direction of reciprocation of the split mold between the position opposed to the parison receiving position and the parison receiving position.

According to this aspect of the invention, blow molding can be performed simply and efficiently by the two reciprocating movements crossing at right angle such as x-y directions.

In one aspect of the invention, a plurality of parisons are supplied simultaneously at the parison receiving position to each split mold which are adapted to receive the plurality of parisons.

According to this aspect of the invention, the blow molding capacity is improved by the multiple supply of parisons and the multiple cavities of the split mold.

In another aspect of the invention, there is provided a blow molding method comprising steps of performing blow molding by supplying a parsion in a split mold and closing the split mold and thereafter discharging a product by opening the split mold at a product discharging position, said method further comprising steps of:

reciprocating a pair of arms capable of being opened and closed relative to each other between the product discharging position, a first delivery position and a second delivery position provided at an equal interval downstream of the product discharging position in the direction of delivering the product, said pair of arms having length corresponding to the interval between the first delivery position and the second delivery position and a label supplying section being provided in correspondence to the first delivery position; and opening and closing the pair of arms sequentially among a product holding and releasing state in which the arms are closed for holding the product and opened for releasing the product, a label takeout state in which the arms are opened for taking out a label from the label supplying section, a label attaching state in which the taken out label is attached to the split mold and an intermediate state in which the arms enter between the opened split mold and the product and thereby performing delivery of the product and taking out and attaching of the label.

According to this aspect of the invention, takeout of the product and attaching of a label to the split mold can be achieved by opening and closing and reciprocating movement of the pair of arms and, therefore, blow molding can be achieved efficiently with a smaller number of split molds than in the blow molding using the rotary type blow molding apparatus. Moreover, the cycle time required for taking out of the product and attaching of a label can be shortened.

In another aspect of the invention, the method further comprises a step of removing flash in a bottom portion of the discharged product at the first delivery position so as to enable the product to be placed in position.

According to this aspect of the invention, the product can be placed at the first delivery position with its bottom portion down at the first delivery position.

In another aspect of the invention, the method further comprises a step of removing flash about a side portion of the discharged product at the second delivery position.

According to this aspect of the invention, flash can be completely removed from the product during the process between taking out of the product from the split mold and delivering out of the product.

In another aspect of the invention, the method further comprises a step of receiving the product at the second delivery position, changing direction of the product and lowering the product for a next step.

According to this aspect of the invention, the product is confined to a desired state and transferred in this state to a next step and, therefore, processing in the next step can be facilitated.

In another aspect of the invention, there is provided a blow molding apparatus of a type in which a split mold is moved to a parison receiving position where a parison is supplied, is closed for performing blow molding at a blow molding position and is opened at a product discharging position for discharging a product, said apparatus comprising:

trains of split molds provided opposed to each other across the parison receiving position;

a first reciprocating section which sequentially reciprocates each split in the trains of the split molds to and from a position opposed to the parison receiving position;

a second reciprocating section which sequentially reciprocates each split mold of the trains of the split molds to and from the parison receiving position in a direction crossing the direction of movement of the first reciprocating section; and a reciprocation control section which controls the first reciprocating section and the second reciprocating section for performing blow molding by reciprocating each split mold to and from the parison receiving position and to and from the product discharging position.

According to this aspect of the invention, by combination of the two reciprocating movements, blow molding can be performed efficiently with a smaller number of split molds and replacement of split molds can be finished in a shorter period of time than the blow molding using the rotary type blow molding apparatus.

In another aspect of the invention, the direction of movement of the first reciprocating section crosses the direction of movement of the second reciprocating section at right angle.

According to this aspect of the invention, blow molding can be performed simply and efficiently by the two reciprocating movements crossing at right angle such as x-y directions.

In another aspect of the invention, the first reciprocating section and the second reciprocating section each comprise a moving table which is constructed in the form of a box made by welding plates.

According to this aspect of the invention, the moving tables are made light-weight so that load in reciprocating movements is reduced to thereby enhance the efficiency of the blow molding.

In another aspect of the invention, there is provided a blow molding apparatus of a type in which an extruded parison is held by a split mold and the parison is formed after a configuration of a cavity of the split mold by blowing compressed gas in the parison, said apparatus comprising:

a blow nozzle communicating with the inside space of the parison held by the split mold; and a blowing and cooling pipe provided in the central portion of the blow nozzle slidably relative to the blow nozzle for blowing compressed gas into the parison and being inserted into a swollen intermediate product for cooling it with the compressed gas.

The intermediate product herein means a swollen parison held in the split mold during blow molding in contrast to a parison in the state of tubular molten resin which has been extruded from a die head.

According to this aspect of the invention, by inserting the blowing and cooling pipe to the inside of the intermediate product, portions where cooling is particularly necessary such as a pinched off portion of a parison (thick portion in a product) and a portion inside of a label can be cooled concentrically. Thus, the cooling efficiency is improved and a product can be taken out in a short period of time whereby the efficiency of blow molding is improved.

In another aspect of the invention, the apparatus further comprises a first reciprocating unit which causes the blow nozzle to communicte with the inside space of the split mold and a second reciprocating unit which inserts the blowing land cooling pipe into the swollen intermediate product, a reciprocating plane of the first reciprocating unit being offset from a reciprocating plane of the second reciprocating unit.

According to this aspect of the invention, addition of the two reciprocating strokes is prevented whereby a compact design of the apparatus can be realized without requiring a bulky apparatus.

In another aspect of the invention, the blowing and cooling pipe comprises a nozzle member which blows compressed gas against a portion of the parison to be cooled.

According to this aspect of the invention, compressed gas can be blown further efficiently to portions where cooling is particularly necessary such as a pinched-off portion and an inside portion of a label of the parison whereby the cooling efficiency can be improved.

In another aspect of the invention, the apparatus further comprises a moving table which is reciprocated by the first reciprocating unit, said moving table being constructed in the form of a box made by welding plates.

According to this aspect of the invention, the apparatus can be made light-weight while supporting load such as moment acting on the moving table.

In another aspect of the invention, there is provided a blow molding apparatus of a type in which a parison is supplied in a split mold, the split mold is closed for blow molding and opened for discharging a product at a product discharging position, said apparatus comprising:

a pair of arms capable of being opened and closed relative to each other and reciprocating between the product discharging position, a first delivery position and a second delivery position provided respectively at an equal interval downstream of the product discharging position in the direction of delivering the product, said pair of arms having length corresponding to the interval between the first delivery position and the second delivery position and comprising product holding sections provided between the pair of arms in end portions of the arm and a label holding section provided in the outside of end portions of the arms on the upstream side in the direction of delivering the product;

a label supplying section provided at the first delivery position; and an arm opening and closing section provided in the pair of arms for opening and closing the pair of arms sequentially among a product holding and releasing state in which the arms are closed for holding the product and opened for releasing the product, a label takeout state in which the arms are opened for taking out a label from the label supplying section, a label attaching state in which the taken out label is attached to the split mold and an intermediate state in which the arms enter between the opened split mold and the product and thereby performing delivery of the product and taking out and attaching of the label.

According to this aspect of the invention, by reciprocating the pair of arms between the three positions of the product discharging position, the first delivery position and the second delivery position, with the pair of arms being present at two of the three positions at a time and opening and closing the pair of arms at the respective opening and closing states, delivery of the product and taking out and attaching of the label can be performed and, therefore, blow molding can be achieved efficiently with a smaller number of split molds than in the blow molding using the rotary type blow molding apparatus and, moreover, the cycle time required for taking out the product and attaching of the label can be shortened.

In another aspect of the invention, the arm opening and closing section comprises:

a cam groove formed in each of the arms;

a pivoting arm having a roller at each end thereof, said roller being engaged in one of the cam grooves of the pair of arms; and drive means for driving and pivoting the pivoting arm.

According to this aspect of the invention, opening and closing of the pair of arms can be controlled in a simple and accurate manner by controlling the pivoting angle of the pivoting arm.

In another aspect of the invention, said product holding sections of the pair of arms are detachable in correspondence to configuration of the product.

According to this aspect of the invention, the product holding sections can be replaced easily when the shape of the product has been changed.

In another aspect of the invention, the product holding section on the downstream side in the direction of delivering the product is constructed in a shape capable of removing flash in an upper side portion of the product in a state in which the product is held by the arms.

According to this aspect of the invention, flash can be removed while the product is held by the product holding section of the pair of arms so that flash can be removed accurately and completely.

In another aspect of the invention, the label supplying section is adjustable in its vertical position and a pivoted position about a horizontal pivot axis in accordance with a state of mounting of a label on the split mold.

According to this aspect of the invention, a label can be attached to the split mold in a desired state of attachment (e.g., position and angle of attachment).

In another aspect of the invention, the apparatus further comprises a bottom portion flash removing section which removes flash in a bottom portion of the discharged product at the first delivery position so as to enable the product to be placed in position.

According to this aspect of the invention, the product can be placed at the first delivery position with its bottom portion down at the first delivery position.

In another aspect of the invention, said bottom portion flash removing section comprises a pair of push rods which are provided on both sides of a central axis of the product and are moved to project toward the central axis of the product.

According to this aspect of the invention, by pinching flash on both sides with the pair of push rods and projecting the push rods, the flash can be twisted and removed. Thus, flash can be removed in a simple manner.

In another aspect of the invention, the apparatus further comprises a flash removing section which removes flash about an upper side portion of the discharged product at the second delivery position.

According to this aspect of the invention, flash can be removed completely during the processing between taking out of the product from the split mold and delivering out of the product.

In another aspect of the invention, said flash removing section comprises a screw portion flash removing section which pinches a screw portion at the upper portion of the product and removes flash from the screw portion and a side flash removing section which pinches a side portion of the product and removes flash from the side portion.

According to this aspect of the invention, flash can be completely removed from the product by removing flash in the screw portion and the side portion of the product.

In still another aspect of the invention, the apparatus further comprises a receiving-turning-lowering section which receives the product from the second delivery position, change direction of the product and lowering the product for a next step.

According to this aspect of the invention, the product can be delivered out in a state suitable for a processing in the next step.

Description of preferred embodiments of the invention will be made below with reference to the accompanying drawings.

BRIEF DESCRIPTION OF THE DRAWINGS

In the accompanying drawings,

FIGS. 10A and 10B are views illustrative of a third step and a fourth step of the embodiment of the blow molding method;

FIGS. 11A and 11B are views illustrative of a fifth step and a sixth step of the embodiment of the blow molding method;

FIGS. 20A, 20B, 20C and 20D are views illustrative of a former half of product delivery and label attaching processes in an embodiment of the blow molding method of the invention.

DESCRIPTION OF PREFERRED EMBODIMENTS

Figure 1:
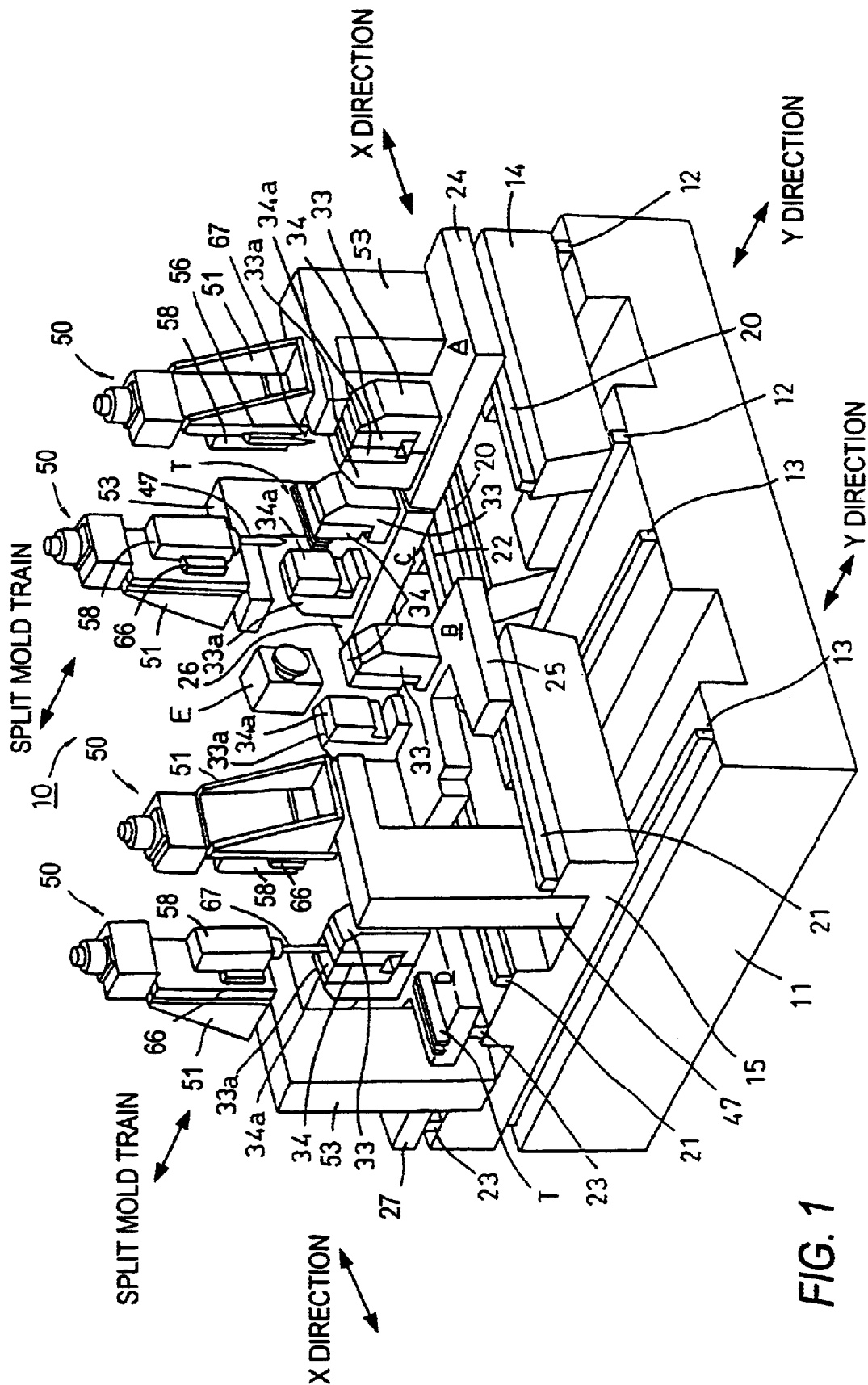
FIG. 1 is a schematic perspective view showing an embodiment of the blow molding apparatus of the invention.
Figure 2:
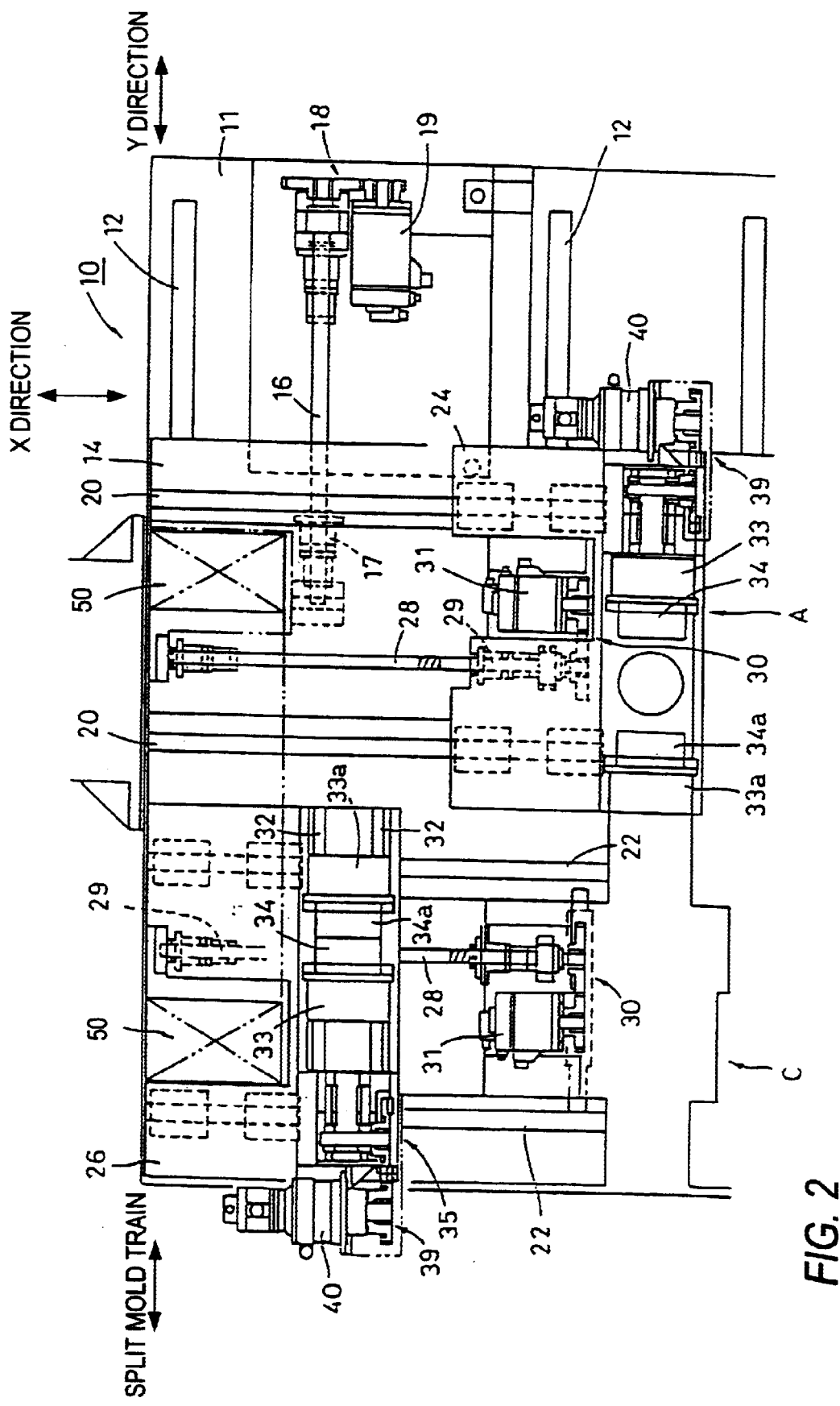
FIG. 2 is a partial plan view of the blow molding apparatus.
Figure 3:
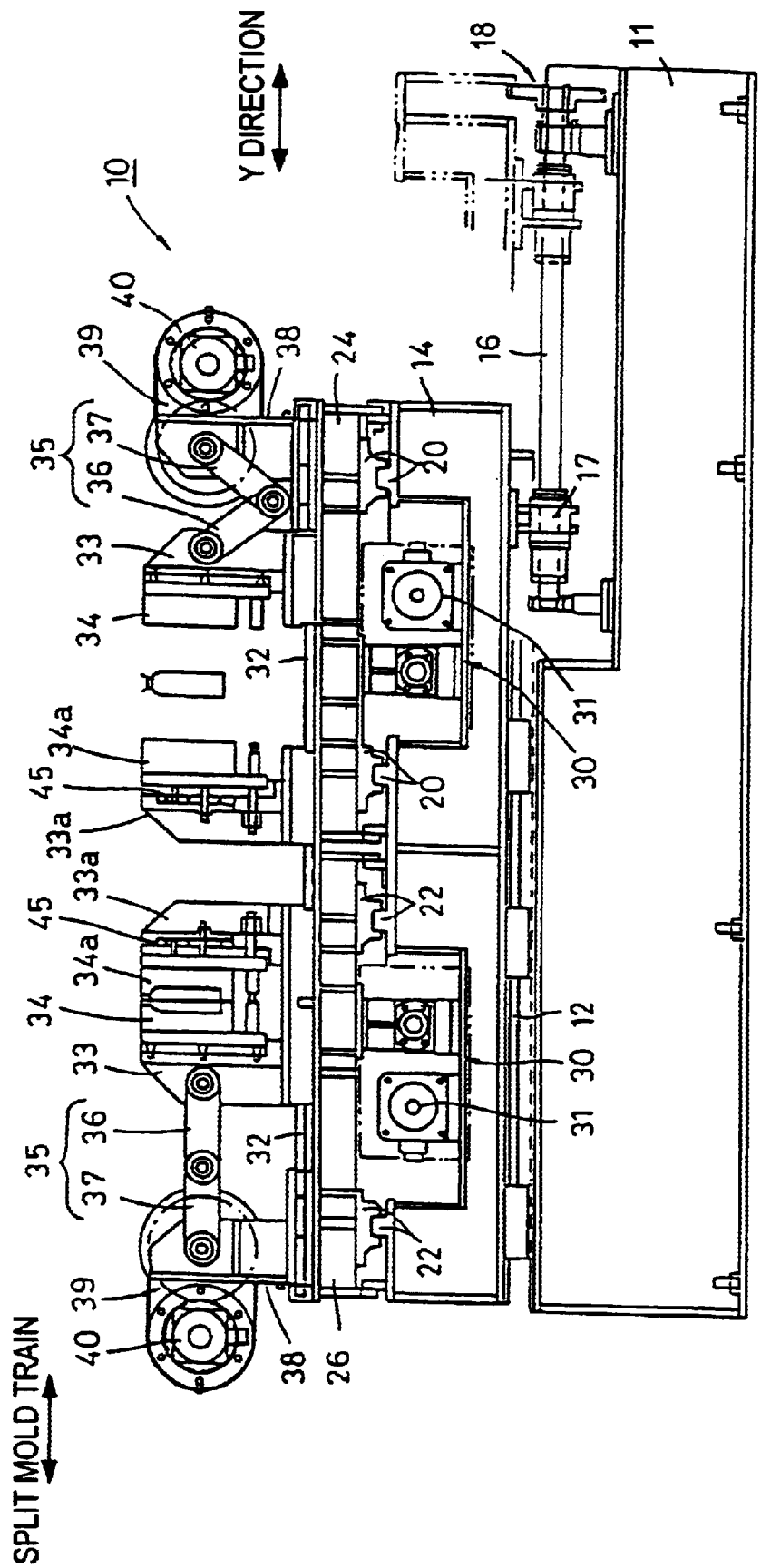
FIG. 3 is a partial side view of the blow molding apparatus.

FIGS. 1 to 3 show an embodiment of the blow molding apparatus of the invention.

The blow molding apparatus 1 includes a shuttle type blow molding unit 10. The blow molding unit 10 includes two trains of split molds, each train including two split molds to form split molds of four stages A, B, C and D. By combination of movements of these split molds of four stages in directions x and y, parisons extruded from a single die head E are sequentially subjected to blow molding.

The blow molding unit 10 has a table 11 disposed on a base. Pairs of LM (linear motion) guides 12 and 13 are mounted on the table 11 across the die head E in parallel to each other to extend in the direction y. Moving tables 14 and 15 moving in the direction y are reciprocably mounted on the LM guides 12 and 13.

As shown in FIG. 3, each of these y-direction moving tables 14 and 15 is made in the form of a box made of plates which are assembled and welded together with reinforcing members provided inside of the box. The moving tables 14 and 15 are thereby made light-weight.

Each of the y-direction moving tables 14 and 15 has, as shown in FIGS. 2 and 3, a nut 17 fixed to the bottom thereof and this nut 17 is screwed on a screw bar 16 which is provided between each of the LM guides 12 and 13. The screw bar 16 is connected at its end portion to a servo motor 19 through a gear 18 and, by rotating the screw bar 16 by the servo motor 19, the y-direction moving tables 14 and 15 can be reciprocated along the LM guides 12 and 13 in parallel to the die head E. Instead of using the gear 18, the screw bar 16 may be connected to the servo motor 19 through a coupling.

On the y-direction moving tables 14 and 15 are mounted pairs of LM guides 20, 21, 22 and 23 in parallel to one another and extending in direction x which crosses at right angle with the direction y in a manner to approach and move away from the die head E. Four x-direction moving tables 24, 25, 26 and 27 are mounted on the LM guides 20 to 23, two x-direction moving tables for one y-direction moving table, so that these moving tables 24 to 27 can reciprocate along these LM guides 20 to 23.

As shown in FIG. 3, each of these x-direction moving tables 24 to 27 is made in the form of a box made of plates which are assembled and welded together with reinforcing members provided inside of the box. The moving tables 24 to 27 are thereby made light-weight.

Each of the x-direction moving tables 24 to 27 has, as shown in FIGS. 2 and 3, a nut 29 fixed to the bottom thereof and this nut 29 is screwed on a screw bar 28 which is provided between each of the LM guides 20 to 23. The screw bar 28 is connected at its end portion to a servo motor 31 through a gear 30 and, by rotating the screw bar 28 by the servo motor 31, the x-direction moving tables 24 to 27 can be reciprocated along the LM guides 20 to 23 in the direction x to move toward and away from the die head E. Instead of using the gear 30, the screw bar 28 may be connected to the servo motor 31 through a coupling.

Thus, in association with the y-direction moving tables 14 and 15, the x-direction moving tables 24 to 27 can move toward and away from the die head E (reciprocating movement in the direction x) and also move in parallel to the die head E (reciprocating movement in the direction y).

The x-direction moving tables 24 to 27 comprise the stages A to D of the same construction, each moving table having one stage. Description will be made about the stage A of the x-direction moving table 24 and component parts of the other stages B to D will be designated with the same reference characters as those of stage A and description thereof will be omitted.

On the x-direction moving table 24 are mounted a pair of LM guides 32 extending in the direction y. A pair of mold supports 33 and 33a are mounted on the LM guides 32 in a manner to relatively move toward and away from each other and thereby to be closed and opened. A pair of split mold members 34 and 34a are fixed on the opposite surfaces of the mold supports 33 and 33a so that cavities of the split mold members 34 and 34a are opposed to each other. An end portion of a link 36 of a link mechanism 35 is connected to the mold support 33 on the outside in the direction y and an end portion of a link 37 which is connected to the link 36 is rotatably supported on a support table 38. The link 37 is connected to a servo motor 40 through a gear 39. By driving the link 35 by the servo motor 40, the split mold member 34 is moved and the pair of split mold members 34 and 34a are thereby opened and closed.

Although illustration is omitted, a rack extending in the direction of opening and closing of the split mold members 34 and 34a is mounted on the mold support 33 of the split mold member 34, a rack extending in the same direction is also mounted on the mold support 33a of the split mold member 34a through a connection rod and a buffer spring, and a pinion which is engageable with these racks is provided on the x-direction moving table 24. Therefore, by driving the split mold member 34 by the servo motor 40, the split mold member 34a is also driven to move toward and away from the split mold member 34. The pair of split mold members 34 and 34a are opened and closed in this manner.

The closed position of the split mold members 34 and 34a is determined by aligning of the links 36 and 37 in a straight line in a closed state of the driving side split mold member 34. In this state, the pair of split mold members 34 and 34a are kept in a connected state by engaging with split mold closing arms (not shown) and kept in a closed state by receiving a split mold closing force imparted by a hydraulic cylinder 45 provided on the rear side of the split mold member 34a. The influence of the split mold closing force to the racks and the pinion is prevented by the buffer spring.

In each of the y-direction moving tables 14 and 15 are provided two blow units 50 through blow unit supports 53 for blowing air into a parison held in the closed split mold members 34 and 34a on the two x-direction moving tables 24 and 26 and the two x-direction moving tables 26 and 27 and for cooling a swollen intermediate product from the inside.

An example of the blow unit of the blow molding apparatus will be described with reference to FIGS. 4 to 7.

Figure 4:
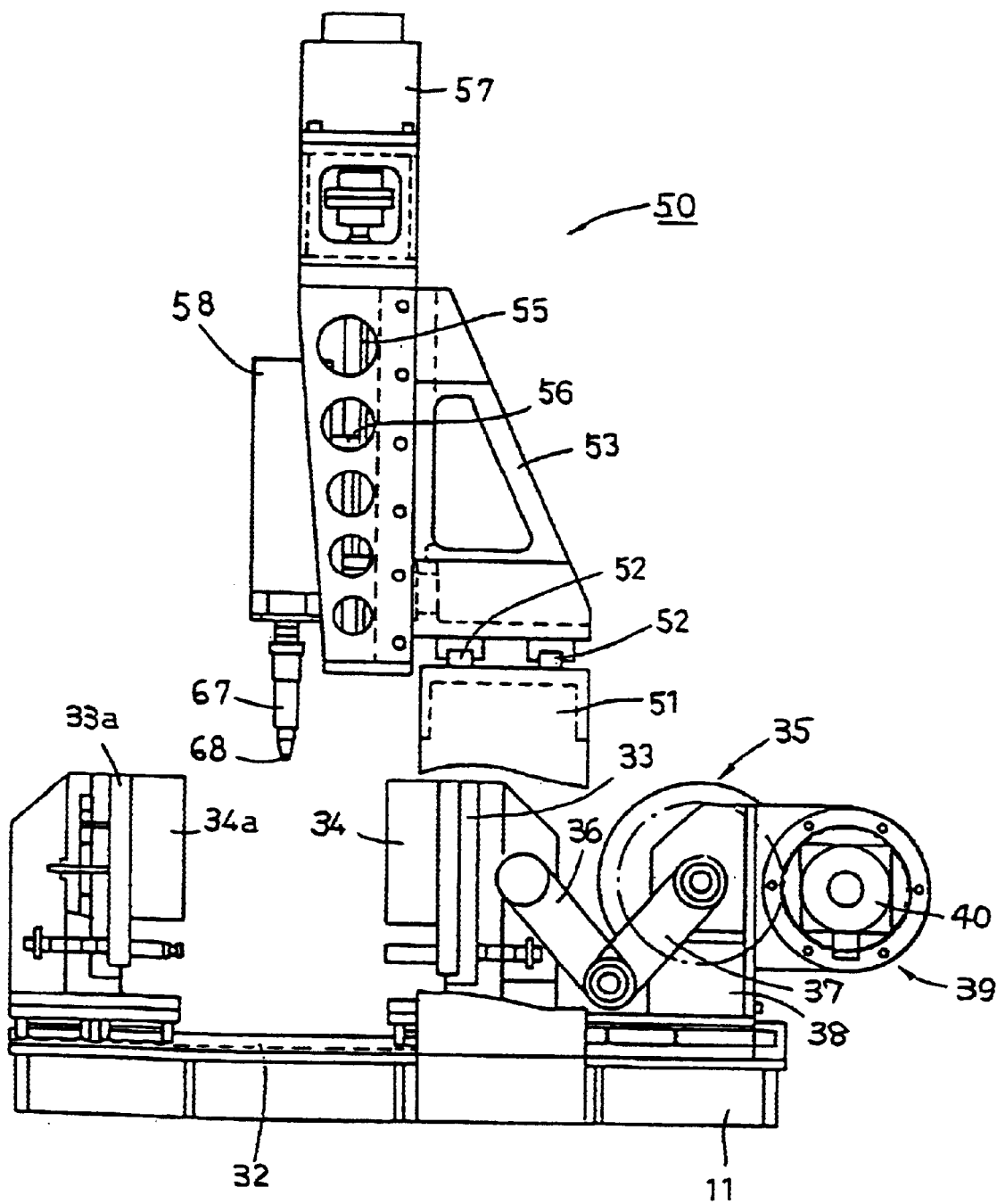
FIG. 4 is a front view of an example of a blow unit and an opening and closing unit of a split mold in the blow molding apparatus.
Figure 5:
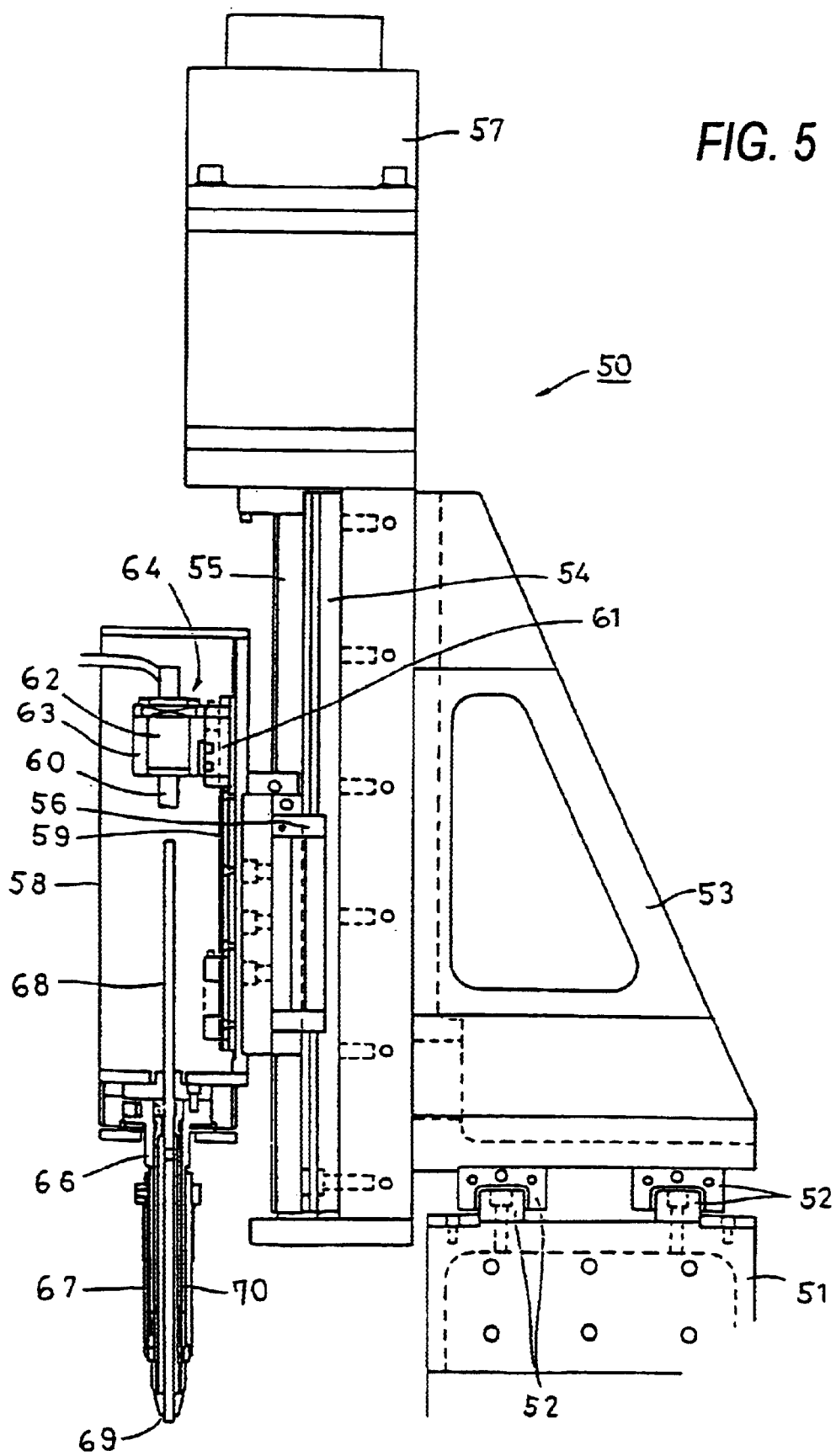
FIG. 5 is an enlarged front view of the blow unit of the blow molding apparatus.
Figure 6:
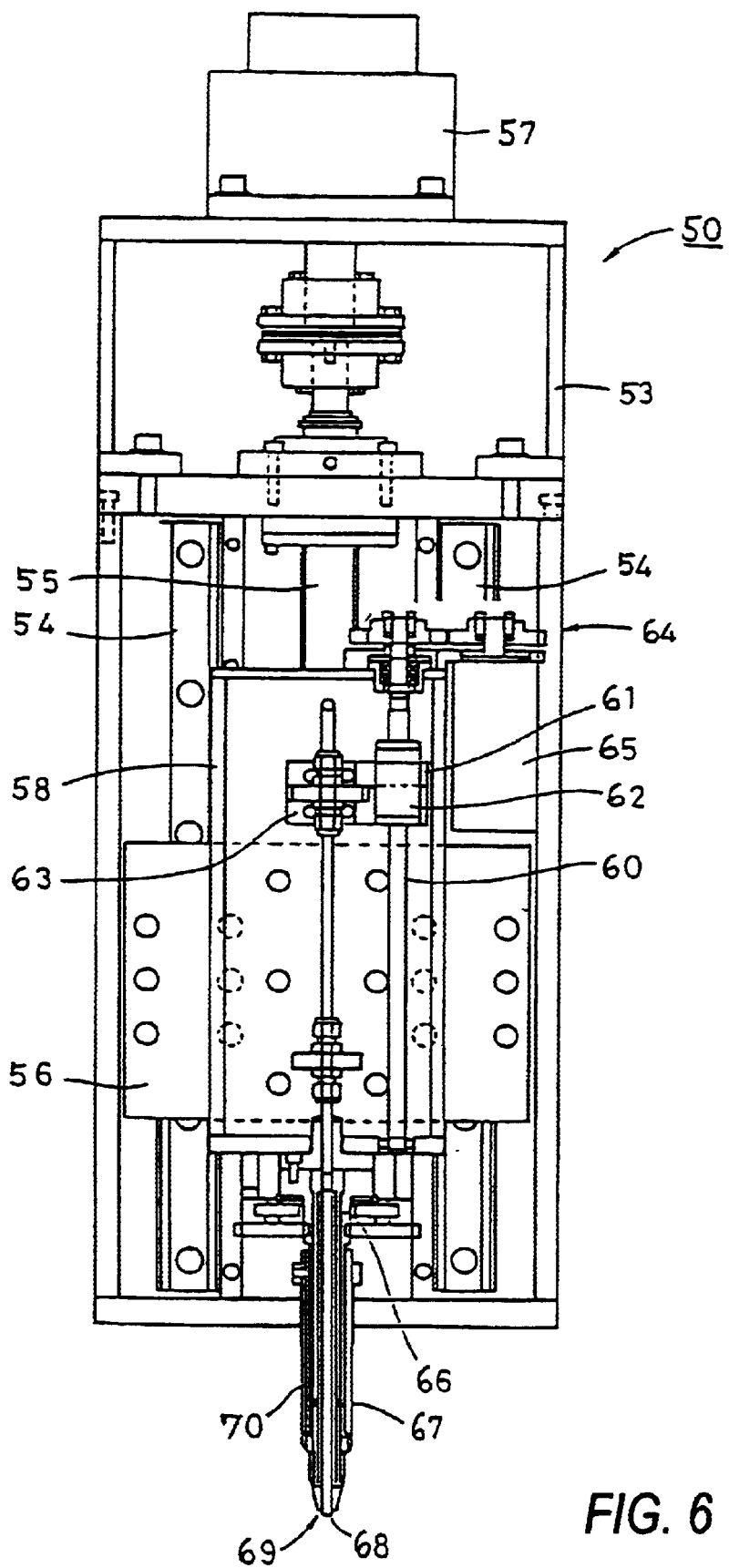
FIG. 6 is an enlarged left side view of the blow unit of the blow molding apparatus.

The blow unit 50 provided above the pair of split mold members 34 and 34a is mounted, as shown in FIG. 4, on a fixed frame 51 mounted on the moving table 14. A pair of LM guides 52 are mounted on the fixed frame 51 and extend in a direction crossing at right angle with the opening and closing direction of the split mold members 34 and 34a. A blow device support 53 is provided on the LM guides 52 in a manner to be adjustable in its position along the LM guides 52. A pair of vertical LM guides 54 are mounted on the vertical surface of the blow device support 53. A slide block 56 which constitutes a drive section of a first moving table has a nut screwed on a screw bar 55 provided between the pair of LM guides 54. The screw bar 55 is connected at its upper end to a servo motor 57 and, by rotating the servo motor 57, the slide block 56 is moved vertically.

A slide box 58 made in the form of a box is fixed to the slide block 56. The slide box 58 is formed in the shape of a box with an open side and a bottom portion opposed to the open side is vertically disposed and is fixed to the slide block 56. In the central portion of this slide box 58 is mounted a single vertical LM guide 59 which constitutes the second reciprocating section. A screw bar 60 is disposed on one side of the LM guide which is supported rotatably by upper and lower bearings. A slide block 61 which constitutes a second moving table has a nut 62 screwed on the screw bar 60 and is vertically reciprocably disposed on the LM guide 59. A blowing and cooling pipe support 63 is mounted on the slide block 61. A gear 64 is provided on the upper end portion of the screw bar 60 which is connected to a servo motor 65 provided on the side of the slide box 58. The slide block 61 therefore is driven to move vertically by the servo motor 65.

Thus, the slide box 58 which constitutes the first reciprocating section is moved up and down relative to the blow device support 53 and the blowing and cooling pipe support 63 which constitutes the second reciprocating section is moved up and down relative to the slide box 58. A double lifting and lowering device therefore is constructed and, since the reciprocating planes of these two reciprocating sections are offset from each other, the height of the blow unit can be reduced while a large reciprocating stroke is secured.

A guide bush 66 is fixed to the lower portion of the slide box 58 in a manner to project downwardly from the bottom surface of the slide box 58. A blow nozzle 67 is mounted on a lower flange of the guide bush 66. A blowing and cooling pipe 68 supplied with compressed gas such as compressed air is relatively reciprocably mounted in the central portion of the blow nozzle 67. The blowing and cooling pipe 68 is fixed in its upper end portion to the blowing and cooling pipe support 63, is guided in its middle portion by the guide bush 66 and can project downwardly from the blow nozzle 67. The blow nozzle 67 is also formed with a compressed gas exit channel 69 on the outside of the blowing and cooling pipe 68 for letting out the compressed gas which channel is sealed with a seal member such as an O-ring. A cooling channel 70 is provided on the outside of the blow nozzle 67 to cool the the blow nozzle 67. The compressed gas exit channel 69 is provided with two valves (not shown). In the initial stage of blowing of compressed gas, the two valves are closed to inflate the parison. When a cooling effect is to be obtained, one of the valves is opened to circulate the compressed gas while maintaining the internal pressure of the product. Upon completion of cooling, the other valve is opened also to release the internal pressure of the product by the two valves and the blowing process thereby is finished.

The blowing and cooling pipe 68 is of a tubular form opening at the lower end (foremost end) thereof and is adapted to blow compressed gas to the bottom portion of a product.

Figure 8A:
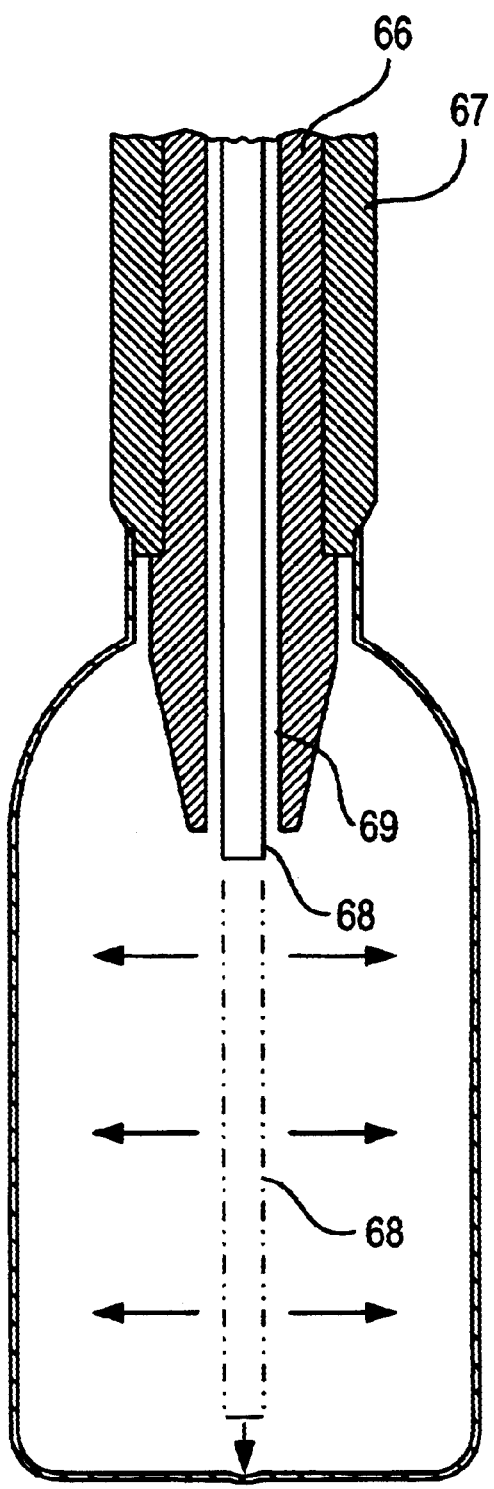
FIGS. 8A and 8B are sectional views of a blow state of the blow unit.
Figure 8B:
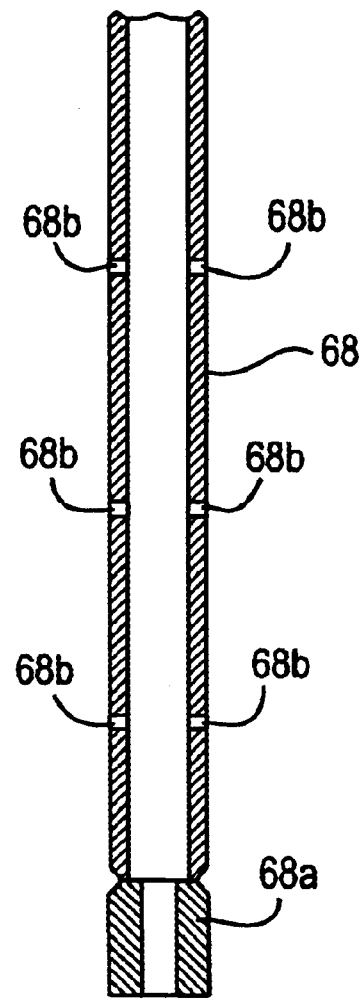

FIG. 8B shows a modified example of the blowing and cooling pipe in which a tip, piece 68a is attached to the lower end of the blowing and cooling pipe 68 and the blowing and cooling pipe 68 is formed with a plurality of injection holes 68b. The compressed gas is blown from the tip piece 68a and the injection holes 68b.

In a case where an in-mold labeling system according to which a label is attached to the inside of the split mold pieces 34 and 34a and the label is attached to a product simultaneously with blow molding is employed, there is tendency toward insufficient cooling in a portion of the product on the rear side of the label resulting in a defect in the product. By using the blowing and cooling pipe 68 having the tip piece 68a and the injection holes 68b, the compressed gas can be blown from the injection holes 68b on the side of the pipe 68 and thereby cool the portion of the product on the rear side of the label sufficiently. Particularly, by forming the injection holes 68b in such a manner that position of the injection holes 68b coincides with the portion of the product on the rear side of the label, cooling of this portion can be achieved further efficiently.

The tip piece 68a blows compressed gas downwardly from the lower end thereof Alternatively, the tip piece 68a may be constructed in such a manner that direction of blowing of compressed gas can be changed so that compressed gas is blown in a wide range or concentrically to one portion. By this arrangement, a portion such as a pinched-off portion (thick portion) of a parison where cooling is particularly necessary can be concentrically cooled.

On the outside of the table 11 in the direction x from the die head E is provided a product takeout unit T including a takeout device 100.

The reciprocal movements of the y-direction moving tables and the y-direction moving tables are controlled by a control unit such as a computer (not shown) which constitutes the reciprocation control section. Opening and closing of the split molds, vertical movements of the blow nozzle 67 and the blowing and cooling pipe 68 and supply of compressed gas are also controlled by a control unit such as a computer.

Operation of the above described blow molding unit 10 of the blow molding apparatus 1 and a blow molding method by this blow molding unit 10 will now be described.

FIGS. 9 to 11 are views illustrative of steps of the blow molding method according to the invention in which operations of a pair of arms only are schematically illustrated as to takeout of a product.

In this blow molding method, the stage A and the stage C among the four stages A, B, C and D are disposed adjacent to each other in the direction y to form one of the trains of split molds. The stage B and the stage D are disposed adjacent to each other to form the other train of split molds opposed to the trains of split molds of the stages A and C across the die head E. The blow molding is effected in the order of the stage A, stage B, stage C and stage D.

Figures 9A, 9B:
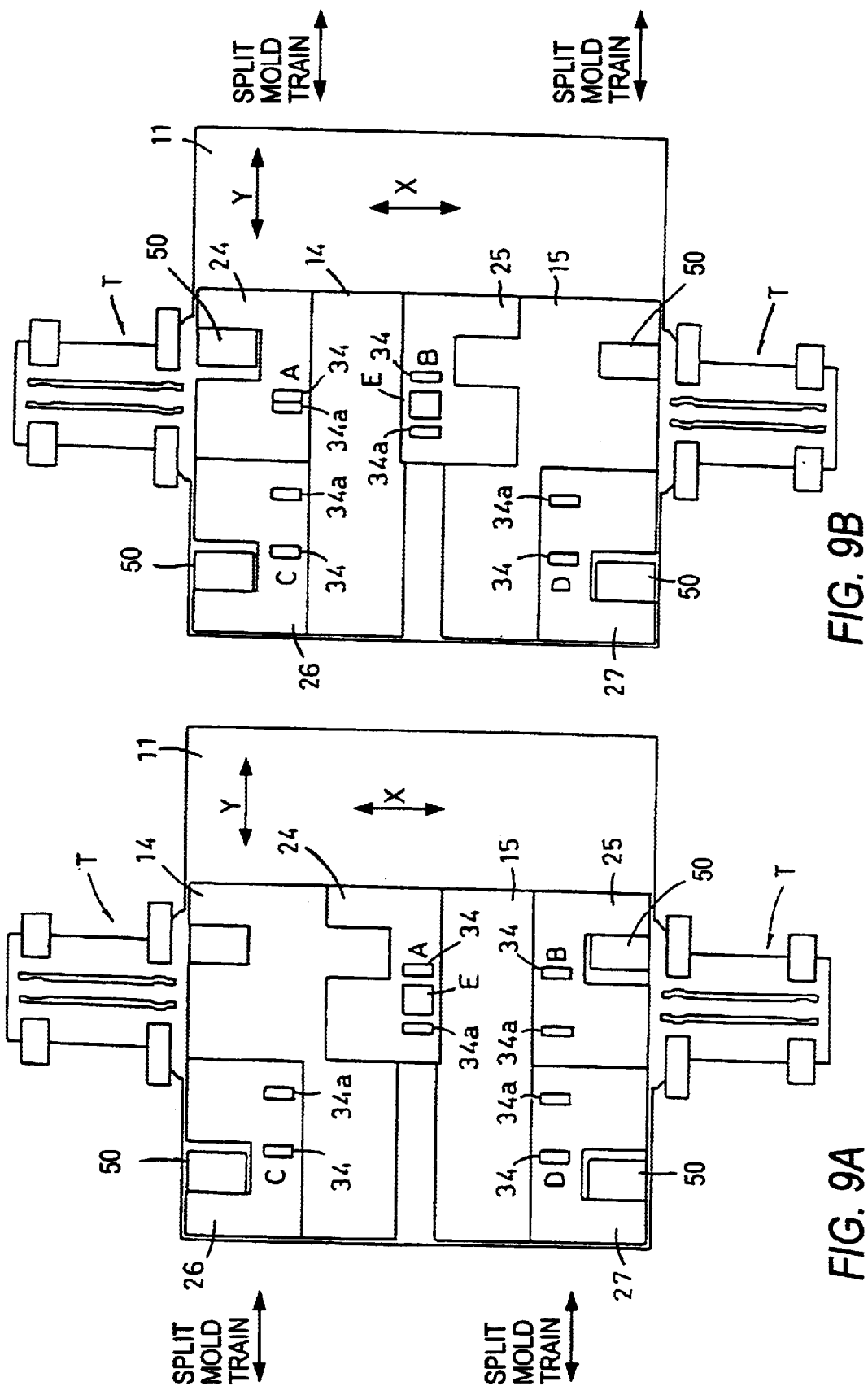
FIGS. 9A and 9B are views illustrative of a first step and a second step of an embodiment of the blow molding method of the invention.

First of all, the two y-direction moving tables 14 and 15 are moved along the LM guides 12 and 13 to a position (left end position in FIG. 9A) at which the stage A and the stage B are opposed to a parison receiving position, i.e., a position at which the stage A and the stage B are opposed to the die head E (see FIG. 9A).

Then, the split mold members 34 and 34a are opened by operation of the servo motor 40, gear 30, link mechanism 35 and racks and pinion and the x-direction moving table 24 is moved along the LM guides 20 to the parison receiving position below the die head E. The split mold members 34 and 34a then receive a parison (FIG. 9A) and are closed by reverse rotation of the servo motor 40.

The split mold members 34 and 34a of the stage A which have received the parison are moved by the movement of the x-direction moving table 24 along the LM guides 20 to a blow molding position which is a position away from the die head E. The blow nozzle 67 of the blow unit 50 is connected to the split mold members 34 and 34a by lowering the slide box 58 and compressed gas such as compressed air is blown into the parison to inflate it and thereafter the blowing and cooling pipe 68 into the swollen intermediate product by lowering the slide block 61 to blow compressed gas into the swollen intermediate product thereby achieving blow molding and cooling.

Simultaneously with withdrawing of the x-direction moving table 24 of the stage A, the x-direction moving table 25 is moved along the LM guides 21 to the parison receiving position below the die head E with the split mold members 34, and 34a of the stage B opposed to the stage A across the die head E being opened. After receiving a parison (FIG. 9B), the split mold members 34 and 34a are closed by the servo motor 40.

The split mold members 34 and 34a of the stage B which have received the parison are moved by the movement of the x-direction moving table 25 along the LM guides 21 to a blow molding position which is a position away from the die head E. The blow nozzle 67 of the blow unit 50 is connected to the split mold members 34 and 34a by lowering the slide box 58 and compressed gas is blown into the parison to inflate it and thereafter the blowing and cooling pipe 68 into the swollen intermediate product by lowering the slide block 61 to blow compressed gas into the swollen intermediate product thereby achieving blow molding and cooling.

On the other hand, the stage C is moved by the movement of the y-direction moving table 14 in the direction y to the position where the stage C is opposed to the parison receiving position, i.e., a position at which the stage C is opposed to the die head E (FIG. 10A). This movement in the y-direction of the stage C to oppose the parison receiving position is performed irrespective of the operation of the stage B after withdrawing of the x-direction moving table 24 of the stage A.

Simultaneously with withdrawal of the x-direction moving table 25 of the stage B, the x-direction moving table 26 of the stage C opposed to the stage B across the die head E is moved along the LM guides 22 to the parison receiving position below the die head E with the split mold members 34 and 34a of the stage C being opened (FIG. 10A). The parison is received by the split mold members 34 and 34a and the split mold members 34 and 34a are closed by the servo motor 40.

The split mold members 34 and 34a of the stage C which have received the parison are moved by the movement of the x-direction moving table 26 along the LM guides 22 to a blow molding position which is a position away from the die head E (FIG. 10B). The blow nozzle 67 of the blow unit 50 is connected to the split mold members 34 and 34a by lowering the slide box 58 and compressed gas is blown into the parison to inflate it and thereafter the blowing and cooling pipe 68 into the swollen intermediate product by lowering the slide block 61 to blow compressed gas into the swollen intermediate product thereby achieving blow molding and cooling.

On the other hand, the stage D is moved by the movement of the y-direction moving table 15 in the direction y to the position where the stage D is opposed to the parison receiving position, i.e., a position at which the stage C is opposed to the die head E (FIG. 10B). This movement in the y-direction of the stage D to oppose the parison receiving position is performed irrespective of the operation of the stage C after withdrawing of the x-direction moving table 25 of the stage B.

Simultaneously with withdrawal of the x-direction moving table 26 of the stage C, the x-direction moving table 27 of the stage D opposed to the stage C across the die head E is moved along the LM guides 23 to the parison receiving position below the die head E with the split mold members 34 and 34a of the stage D being opened (FIG. 10B). The parison is received by the split mold members 34 and 34a and the split mold members 34 and 34a are closed by the servo motor 40.

The split mold members 34 and 34a of the stage D which have received the parison are moved by the movement of the x-direction moving table 27 along the LM guides 23 to a blow molding position which is a position away from the die head E. The blow nozzle 67 of the blow unit 50 is connected to the split mold members 34 and 34a by lowering the slide box 58 and compressed gas is blown into the parison to inflate it and thereafter the blowing and cooling pipe 68 into the swollen intermediate product by lowering the slide block 61 to blow compressed gas into the swollen intermediate product thereby achieving blow molding and cooling.

On the other hand, the stage A is moved by the movement of the y-direction moving table 14 in the direction y to the position where the stage A is opposed to the parison receiving position, i.e., a position at which the stage A is opposed to the die head E (FIG. 11A). The split mold members 34 and 34a of the stage A are opened and the product is taken out by a product takeout device T provided in the rear of the stage A and a label is attached. The movement of the stage A in the y-direction to oppose the parison receiving position and taking out of the product are performed irrespective of the operations of the stages B and D after withdrawal of the x-direction moving table 26 of the stage C.

Simultaneously with withdrawal of the x-direction moving table 27 of the stage D, the x-direction moving table 24 of the stage A opposed to the stage D across the die head E is moved along the LM guides 20 to the parison receiving position below the die head E with the split mold members 34 and 34a of the stage C being opened. The parison is received by the split mold members 34 and 34a (FIG. 11B) and the split mold members 34 and 34a are closed by the servo motor 40.

By the time of receiving of the parison by the stage A, the stage B is moved by the movement of the y-direction moving table 15 in the direction y to the position where the stage B is opposed to the parison receiving position, i.e., a position at which the stage B is opposed to the die head E (FIG. 11B). The split mold members 34 and 34a of the stage B are opened and the product is taken out by a product takeout device T provided in the rear of the stage B and a label is attached to the product. The movement of the stage B in the y-direction to oppose the parison receiving position and taking out of the product are performed irrespective of the operations of the stages A and C after withdrawal of the x-direction moving table 27 of the stage D.

Then, the movement of a next stage to the position opposed to the parison receiving position, takeout of the product, attaching of a label and receiving of a parison at the parison receiving position are repeated to continuously perform blow molding.

According to the blow molding unit 10 and the blow molding method using this blow molding unit 10, blow molding is performed by combining the movement in the y-direction of the train of the two pairs of the split mold members 34 and 34a consisting of the stages A and C and the train of the two split mold members 34 and 34a consisting of the stages B and D with the movement in the x-direction of the respective split mold members 34 and 34a and, accordingly, blow molding can be continuously performed with the four split molds whereby the number of split molds can be reduced significantly as compared to a case where the prior art rotary type blow molding apparatus is used. Therefore, replacement of split molds can be achieved in a relatively short period of time and a small scale production of a variety of types of products can be efficiently performed. Particularly, in the case of a small scale production, blow molding can be realized by using only a single stage or two stages.

Since, according to the blow molding unit 10 and the method using this blow molding unit 10, blow molding can be realized with a single die head E and split mold members 34 and 34a of four stages, parisons can be supplied in a stable manner and efficiency of blow molding is remarkably improved and a large scale production can be achieved efficiently as compared to a case where the prior art shuttle type blow molding apparatus is used.

Further, according to the blow molding unit 10 and the blow molding method using this blow molding unit 10, time between receipt of a parison by the respective split mold members 34 and 34a and receipt of a next parison via takeout of the first parison can be prolonged as desired without being limited as in the case of the rotary type blow molding appratus and, therefore, sufficient time can be allotted to taking out of a product and also to attaching of a label to the inside of the split mold members during blow molding.

Further, since the x-direction moving tables 14 and 15 and the y-direction moving tables 24 to 27 are constructed in the form of a box made by welding plates, these moving tables can be made light-weight and, therefore, driving force for moving them is reduced to the extent that these moving tables can be driven by small servo motors so that positioning of the moving tables can be accurately made.

In the above described embodiment of the blow molding unit 10, moving directions of split molds are x-direction and y-direction crossing at right angles with each other. Alternatively, any two directions may be used such as x-direction and a direction which crosses with the x-direction.

In the above described embodiment of the blow molding unit 10, a single parison is supplied by the die head E to a pair of split mold members and blow molding is performed in the stages A, B, C and D so that a parison of a stable quality can be easily supplied for blow molding. Alternatively, a plurality of parisons may be supplied at a time from the die head E in a multiple parison device.

In such multiple parison device, a plurality of parisons are supplied simultaneously from the die head E and split mold members of each stage have a plurality of cavities corresponding in number to the number of the parisons supplied simultaneously.

In this case, other units of the blow molding apparatus 1 need to be adapted to process a plurality of parisons and products simultaneously. For example, a plurality of blow units 50 and blowing and cooling pipes 68 need to be provided in each stage.

Further, in this case, the product takeout device must be capable of taking out a plurality of products simultaneously and also taking out a plurality of labels and attaching them simultaneously.

According to such blow molding apparatus and method including the multiple parison devicee for supplying a plurality of parisons simultaneously, the number of products which can be produced simultaneously in each stage is increased in proportion to the number of parisons supplied simultaneously so that a large scale production can be further enhanced.

In addition to the employment of a multiple parison device, the number of split molds can be increased by increasing the number of the stages in the split mold trains and the blow molding efficiency can thereby be further improved and a blow molding apparatus corresponding to a required amount of production can be constructed in a simple manner.

In the above described embodiment of the blow molding unit 10, all of the four split molds are fully used for performing blow molding. In the case of using the multiple parison device, the number of split molds used for blow molding may be reduced to cope with a small scale production.

Description will now be made about blowing and cooling operations by blowing compressed gas by the blow unit 50 into a parison held by a closed pair of split mold members in each of the stages A, B, C and D.

For closing the split mold members 34 and 34*a*, as already was described, the rotation shaft of the link mechanism 35 is rotated by the servo motor 40 to rotate the link 36 through the link 37 which constitutes a crank arm and thereby move the mold support 37 forwardly along the LM guides 32. The forward movement of the mold support 37 is transmitted to the rack constituting the driven opening and closing structure and the mold support 33*a* connected to the rack through the pinion, rack and connection rod (not shown) is thereby moved so that the pair of mold supports 33 and 33*a* are moved toward each other and the split mold members 34 and 34*a* are thereby closed. The closed position of the split mold members 34 and 34*a* is determined at a position where, in a state in which the drive side split mold member 34 is closed, the link 36 and the link 37 which constitutes the crank arm form a dead point of the link mechanism at which the link 36 and the link 37 are aligned in a straight line. By corresponding closing of the split mold member 34*a*, the pair of split mold members 34 and 34*a* are positioned at a predetermined position.

For holding the pair of split mold members 34 and 34*a* in the closed state, an unillustrated fixed hook and an unillustrated pivotable hook of a closed state holding device are engaged to each other and a closing force is applied by an unillustrated hydraulic cylinder.

After closing the split mold members 34 and 34*a*, blowing of compressed gas by the blow unit 50 is performed. For this purpose, the screw bar 55 is rotated by the servo motor 57 to lower the slide box 58 which is integral with the slide block 56 and thereby connect the tip of the blow nozzle 67 to a parison held by the pair of split mold members 34 and 34*a*. In this state, the blowing and cooling pipe 68 projects slightly downwardly from the lower end of the blow nozzle 67 which is in an uplifted position.

Figures 7A, 7B:
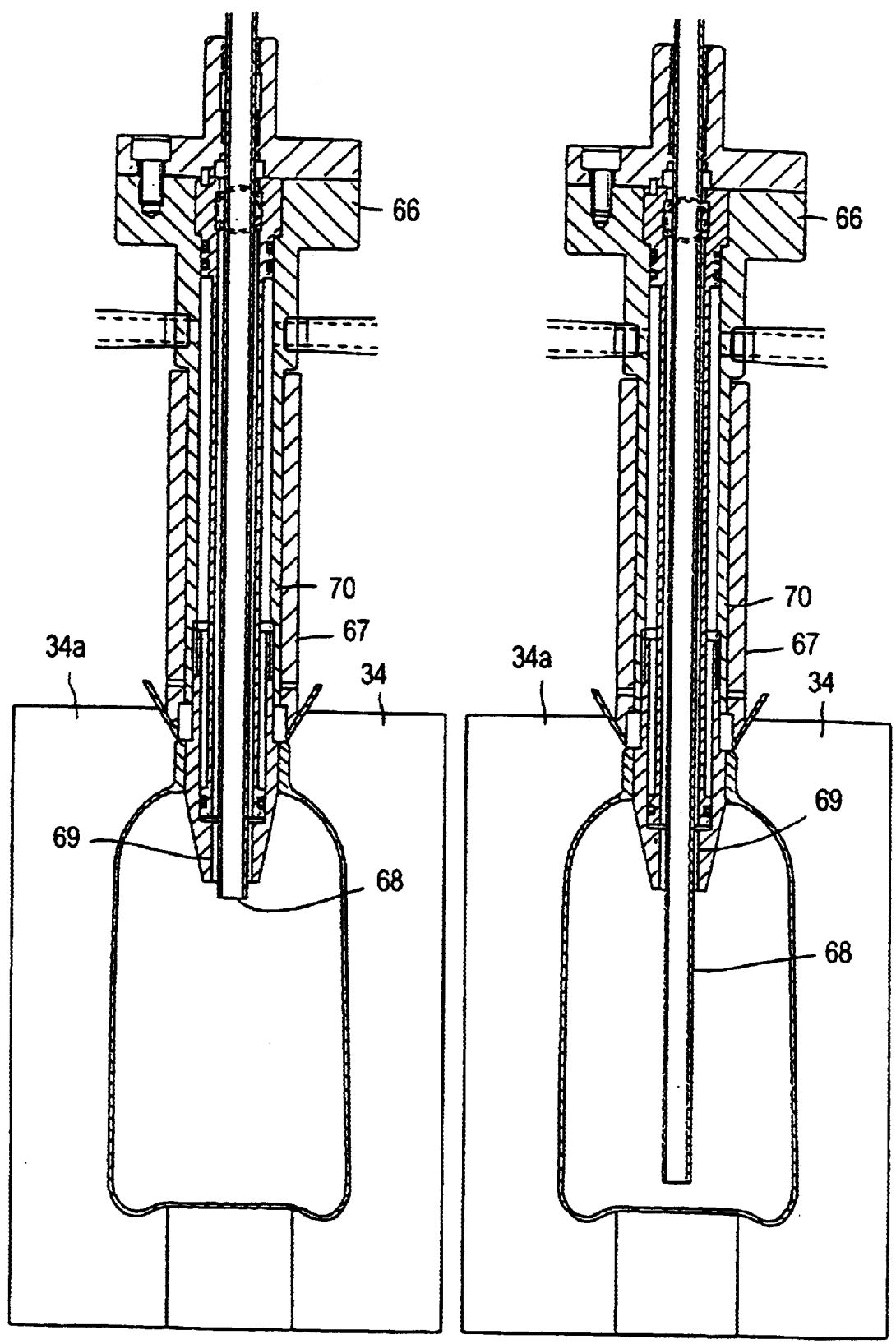
FIGS. 7A and 7B are sectional views of a blow state of the blow unit.

Then, compressed gas is supplied through the blowing and cooling pipe 68 with the valve of the exit channel 69 of the blow nozzle 67 being closed. The parison thereby is swollen and becomes an intermediate product (FIG. 7A).

Then, the screw bar 60 is rotated by the servo motor 65 through the gear 64 to lower the blowing and cooling pipe support 63 which is integral with the slide block 61 to which the nut 62 is fixed relative to the slide box 58. The valve of the exit channel 69 of the blow nozzle 67 is opened and the blowing and cooling pipe 68 is inserted to a portion inside of the swollen intermediate product near the bottom thereof while supplying the compressed gas continuously (FIG. 7B).

Thus, by blowing compressed gas in the state in which the blowing and cooling pipe 68 is inserted to the portion near the bottom of the intermediate product, the intermediate product can be cooled from the inside thereof so that even a thick portion at the bottom such as pinched off portion of a parison which is difficult to cool sufficiently can be conentrically cooled. Besides, compressed gas which is blown to the bottom portion of the intermediate product rises along the inside side surface of the intermediate product and this enhances the cooling effect.

Time required for blow molding therefore can be shortened and the efficiency of blow molding can be improved.

According to this blow unit 50, the mechanism for vertically moving the blow nozzle 67 and the mechanism for vertically moving the blowing and cooling pipe 68 are constructed of two different vertically reciprocating structures which are offset in their reciprocating planes. Accordingly, the height of the apparatus can be held at a low height while a large vertical stroke can be secured by which the blowing and cooling pipe 68 can be inserted to the portion near the bottom of the intermediate product.

Further, since the blowing and cooling pipe 68 is guided by the LM guides 59 and the guide bush 66 mounted on the slide box 58, the blowing and cooling pipe 68 can be vertically reciprocated in a stable manner in spite of a large reciprocating stroke. Since the slide box 58 is made in the form of a box, the apparatus can be made light-weight while necessary rigidity for supporting moment produced by blow molding is secured.

In the embodiment in which the tip piece is attached to the lower end of the blowing and cooling pipe 68 to change the direction of blowing of compressed gas, a portion of the intermediate product where cooling is particularly necessary can be concentrically cooled depending upon the shape of the intermediate product.

In the above described embodiment, the two reciprocating mechanisms for the blow nozzle and the blowing and cooling pipe are provided so that the reciprocating planes of these two reciprocating mechanisms are offset from each other. The invention is not limited to this but the two reciprocating mechanisms may be provided on the same reciprocating planes if there is sufficient space to do so.

The blow mechanism of the above described embodiment has been described with respect to a case where blowing is made downwardly. The invention however can be applied also to a case where blowing is made upwardly or sidewise.

Figure 12:
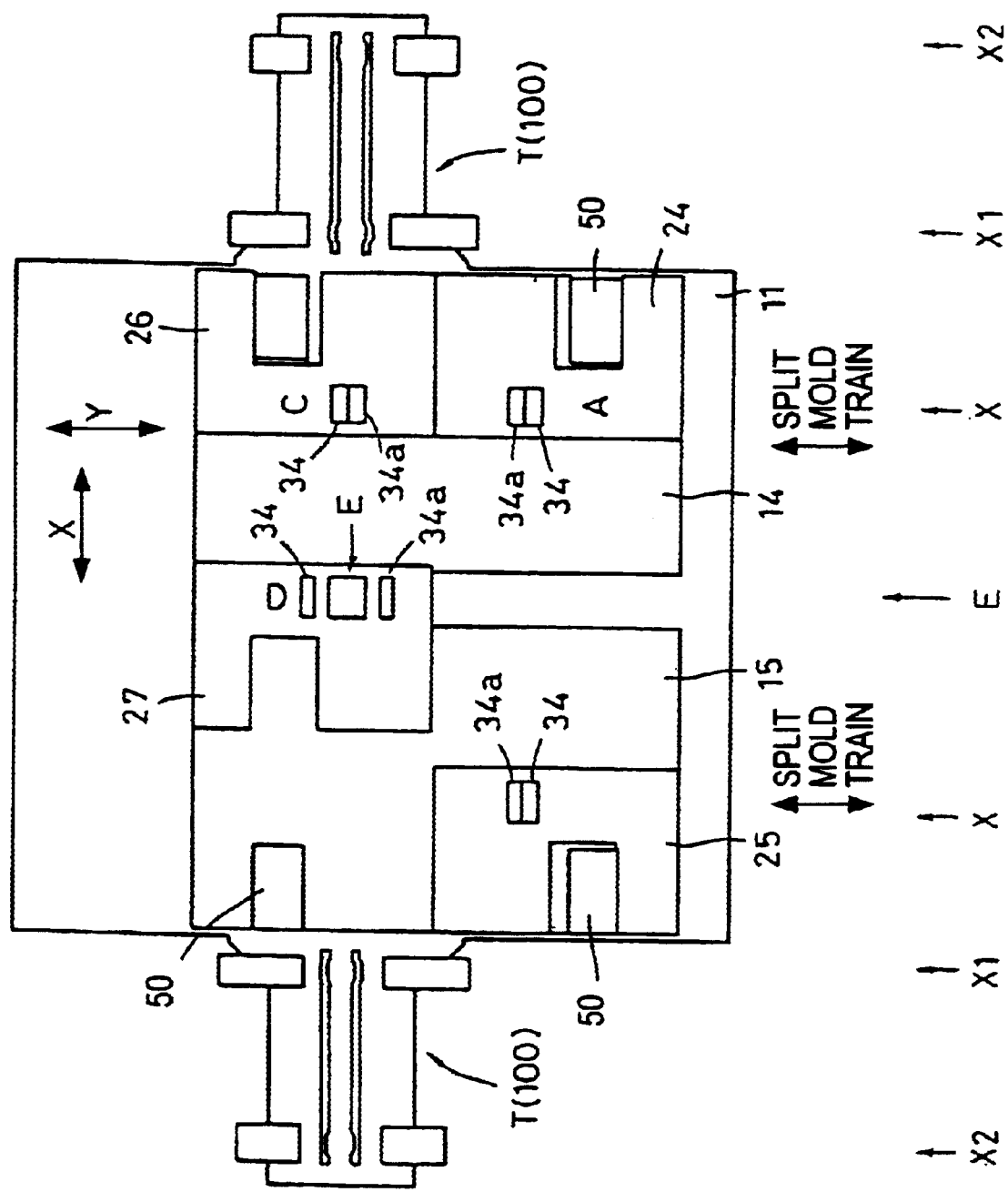
FIG. 12 is a plan view schematically showing the arrangement of an embodiment of the blow molding apparatus of the invention.
Figure 13:
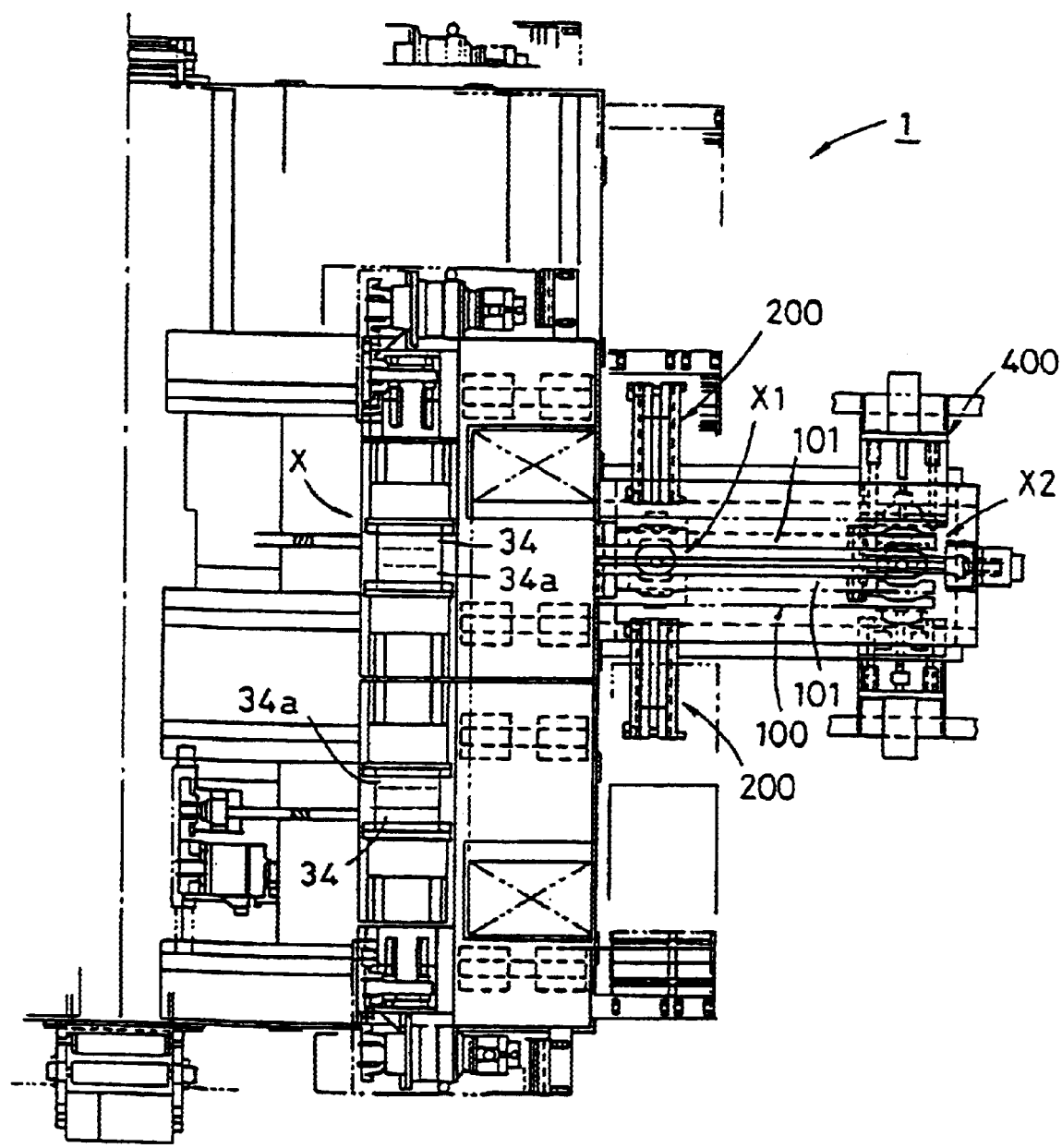
FIG. 13 is an enlarged plan view of a right side half of the embodiment.
Figure 14A:
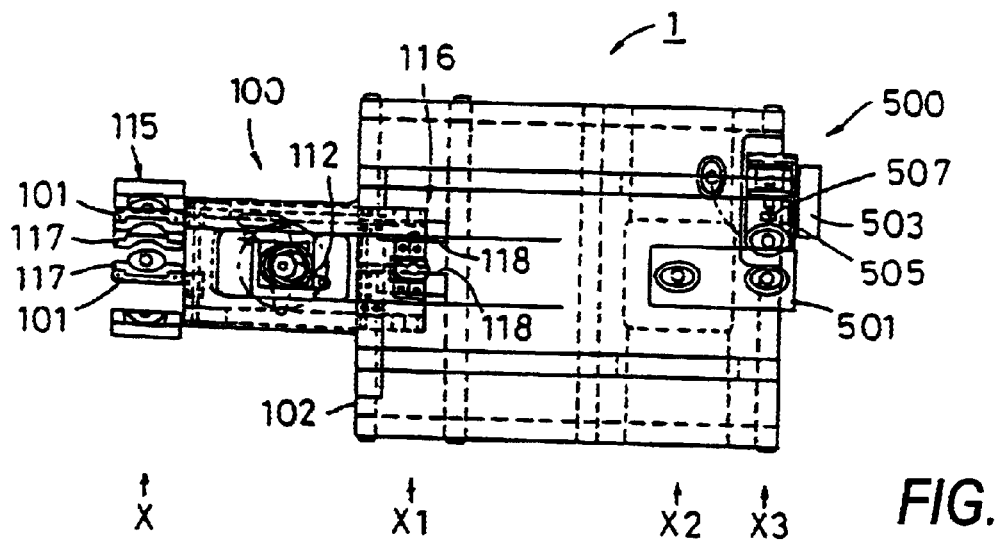
FIGS. 14A and 14B are plan view and front view showing an embodiment of the blow molding apparatus excluding a blow molding unit.
Figure 14B:
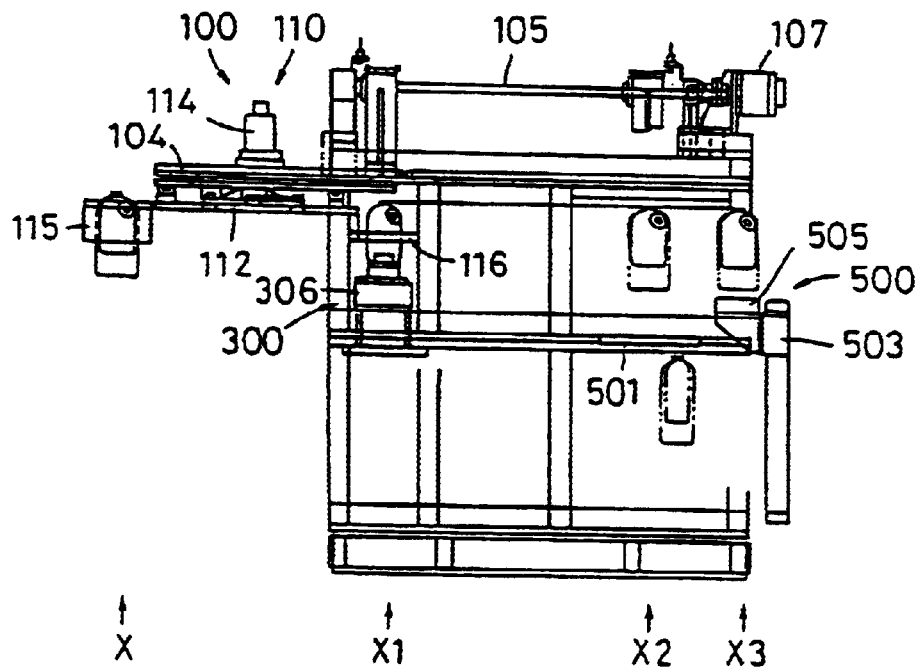

The compressed gas may be blown not only from the foremost end of the blowing and cooling pipe but also from the side portion thereof Examples of delivery of products, removal of flash from the products and attaching of a label to the products in the blow molding apparatus of the invention will now be described with reference to FIGS. 12 to 14.

In the blow molding unit 10 of the blow molding apparatus 1, delivery of products, removal of flash from the products and attaching of a label are performed with two trains of split molds. Since the component parts of the respective trains of split molds are of the same construction, description will be made about one train only.

For taking out a product formed by blow molding by the blow molding unit 10 and attaching a label to the split mold, takeout devices 100 are provided.

In each of the takeout devices 100, there is provided a product discharging position X at which the split mold members are opened after blow molding and the product is discharged and taken out. A first delivery position X1 for placing a taken out product is provided downstream of the product discharging position X in the direction of delivery of the product. A second delivery position X2 is provided downstream of the first delivery position X1 in the direction of delivery of the product at an interval from the first delivery position X1 which is equal to an interval between the product discharging position X and the first delivery position X1. Thus, the three positions X, X1 and X2 are determined at an equal interval.

Each of the takeout devices 100 has a pair of opening and closing arms 101 for transferring a product between the product discharging position X and the first delivery position X1 and between the first delivery position X1 and the second delivery position X2. The opening and closing arms 101 are constructed of a pair of arms which can be opened and closed relative to each other and have a length which corresponds to (are equal to) the interval between the product discharging position X and the first delivery position X1 (i.e., the interval between the first delivery position X1 and the second delivery position X2) so that the arms 101 can perform their operation simultaneously aft the respective positions.

Figure 15:
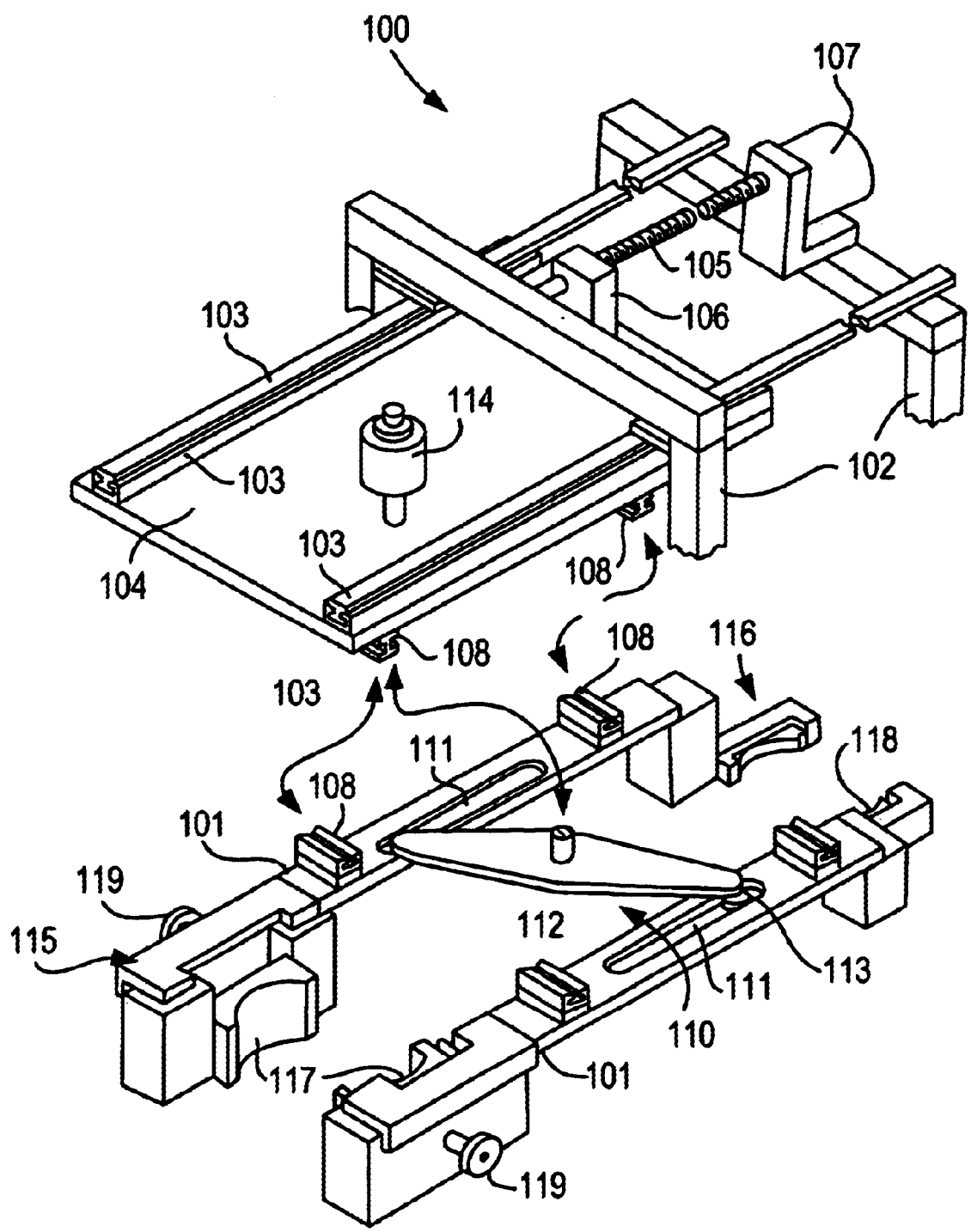
FIG. 15 is an exploded perspective view showing an example of a product takeout device of the blow molding apparatus.

In this takeout device 100, as shown in the exploded view of FIG. 15, a pair of guide rails 103 are mounted in parallel to each other in the direction of delivery of the product on a frame 102 of the apparatus. An arm moving table 104 is fixed to the lower surfaces of the guide rails 103 so as to be reciprocable in the direction of delivery of the product.

A nut 106 which is screwed on a screw bar 105 provided between the guide rails 103 is fixed on the upper surface of the arm moving table 104. The screw bar 106 is connected at one end thereof to a servo motor 107 and, by rotating the screw bar 106 by the operation of the servo motor 107, the arm moving table 104 can be reciprocated A pair of guide rails 108 are fixed on the lower surface of the arm moving table 104 extending in the direction normal to the direction of delivery of the product and a pair of opening and closing arms 101 are provided along the guide rails 108 in such a manner that the arms 101 can be opened and closed relative to each other.

An arm opening and closing mechanism 110 is provided on the pair of arms 101. The arm opening and closing mechanism 110 includes a pair of cam grooves 111 formed in the pair of arms 101 in the direction of delivery of the product, a pivoting arm 112 having a pair of rollers 113 at end portions thereof, said rollers 113 being engaged in the cam grooves 111, and a servo motor 114 mounted on the arm moving table 114 to which the pivoting shaft of the pivoting arm 112 is connected. By pivoting the pivoting arm 112 by the operation of the servo motor 114, the pair of arms 101 can be opened and closed. The pair of arms 101 can be opened and closed by controlling the pivoting angle of the pivoting arm 112 among a product holding state in which the arms are closed to hold a product, a releasing state in which the arms are opened for releasing the product, a label takeout state in which a label is taken out from a label supplying section, a label attaching state in which the taken out lable is attachd to the split mold and an intermediate state in which the arms can move between an intermediate product and the opened split mold.

The opening and closing arms 101 normally assume four states, i.e., a closed state, an opened state for taking out a label, a further opened state for attaching the taken out label to the split mold and an intermediate state. Depending upon the size of the product, however, there is a case where taking out of a label and attaching of the taken out label to the split mold by the arms 101 can be made in an opened state of the same degree and, in this case, the pair of arms 101 may be operated in three states, i.e., a closed state, an opened state and an intermediate state.

The pair of arms 101 which are thus reciprocated by the arm moving table 104 and opened and closed relative to each other have product holding sections 115 and 116 in the inside of end portions thereof. The product holding section 116 on the downstream side in the direction of delivery of the product has a lower height than the product holding section 115 and is adapted to hold the product in its central portion in the vertical direction so as to enable flash to be removed from the product while the product holding section 116 is holding the product.

The product holding sections 115 and 116 include a pair of detachable holding pads 117 and a pair of detachable holding pads 118 respectively fixed to recessed portions of the product holding sections 115 and 116 by means of bolts (not shown). The holding pads 117 and 118 can be replaced depending upon the size and/or shape of a product.

In the end portion of the arms 101 on the upstream side in the direction of delivery of the product and on the outside of the product holding section 115 are provided a pair of label holding units 119 in the form of a vacuum suction pad which can hold a label by vacuum suction.

Accordingly, in this takeout device 100, a label is attached to the label holding unit 119, the arms 101 which are opened in an intermediate open stage are moved in a space between the opened split mold members and the product, the arms 101 are thereafter opened further to attach the label to the inside surface of the split mold member and then the arms 101 are closed to hold the product between the holding pads 117 of the product holding section 115. In the product holding section 116, the product can be held and released with the holding pads 118 by closing and opening of the arms 101. In the product holding section 116, flash of the product is exposed in the state in which the product is held in the product holding section 116 so that flash can be removed while the product is held in the holding section 116.

Figure 16:
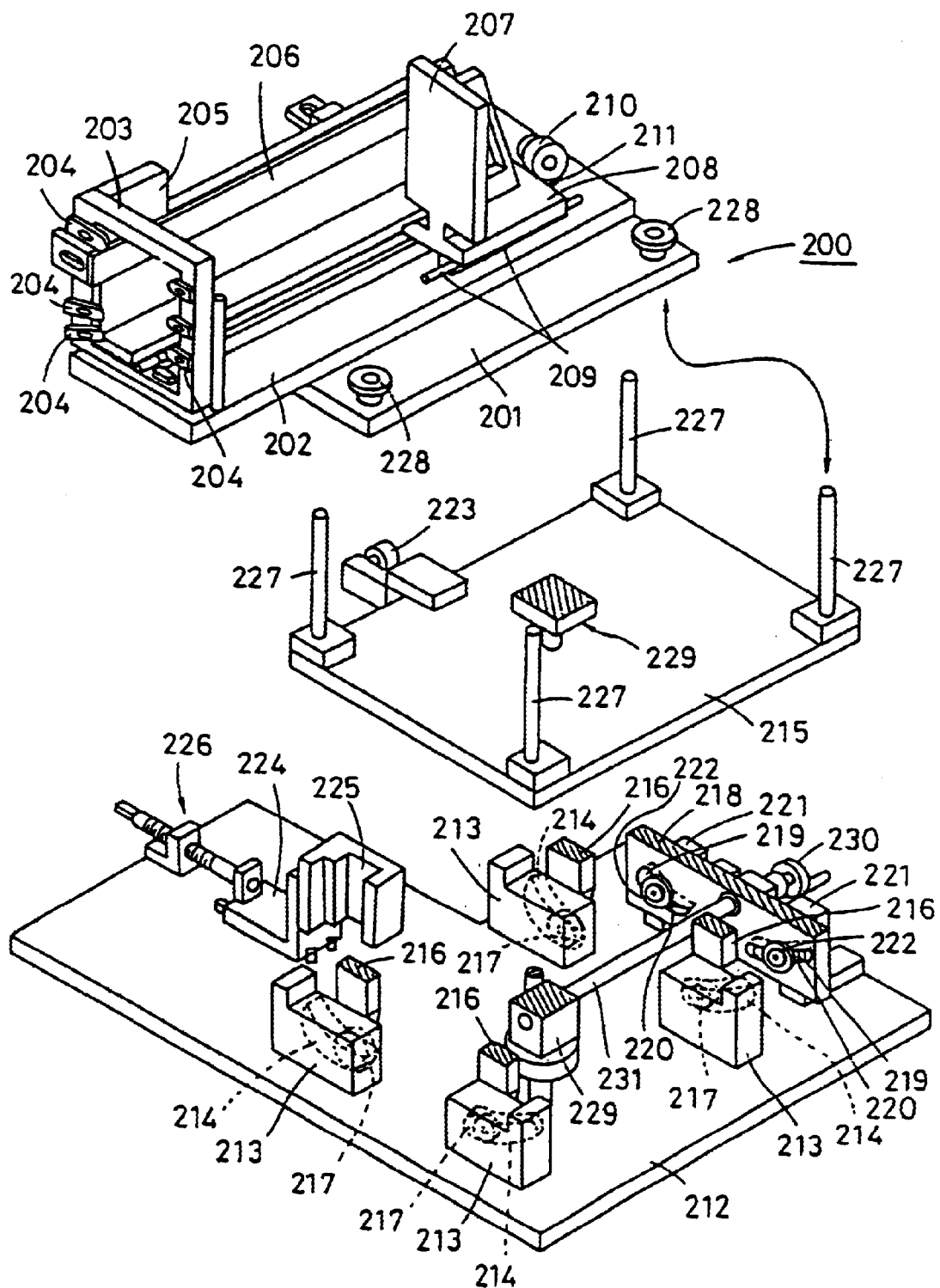
FIG. 16 is an exploded perspective view showing an example of a label supplying section of the blow molding apparatus with a part thereof being omitted.

In the blow molding apparatus 1, as shown in FIG. 16, a label supplying section 200 is provided in correspondence to the first delivery position X1 so as to supply a label one by one.

This label supplying section 200 has, as shown in the exploded view of FIG. 16, a vertically movable table 201 and a support table 202 which is fixed to the vertically movable table 201 and projects forwardly. In the foremost end portion of the support table 202 is secured a label takeout frame 203 by means of support pins and with a gap between the surface of the support table 202. Air nozzles (not shown) are provided in the upper and lower portions of the label takeout frame 203 for supplying labels one by one by blowing air and thereby releasing the label from the label takeout frame 203. Stop pieces 204 are mounted on the sides of the label takeout frame 203, three stop pieces on each side in a manner to project slightly inwardly to hold a label on the foremost end side of a stack of labels. A label can be taken out overriding these stop pieces 204.

On both sides of the support table 202 and on the rear surface of the label takeout frame 203 are provided side frames 205 which are fixed to the support table 202. On the inside of the side frame 205 are provided a pair of label support frames 206 of an L-shape with their bottom surfaces facing inside. The label support frames 206 are secured to the side frames 205 and the label takeout frame 203 by means of bolts (not shown) which are inserted through slots formed in the label support frames 206 A space is defined between the bottom surfaces of the label support frames 206. By changing the securing position of these label support frames 206, labels of different sizes can be supported by the label support frames 206.

A label holding plate 207 is disposed between the label support frames 206. A moving section 208 of an inverted T shape which is formed integrally with the label holding plate 207 is disposed below the space defined between the bottom surfaces of two label support frames 206. This moving section 208 is reciprocable along a pair of guide rails 209 secured to the support table 202. A belt 211 of a winding drum 210 containing a wound spring and secured to the rear portion of the moving section 208 is fixed to the end portion of the support table 202. By this arrangement, the label holding plate 207 constantly receives a forwardly urging force.

A stack of vertically erected labels is provided between the pair of label support frames 206 with the foremost end label being engaged by the stop pieces 204 of the label takeout frame 203 and with the rear end label being pushed constantly forward by the label holding plate 208. In this state, a label is sucked from the label takeout frame 203 onto the vacuum suction pad of the label holding unit 119 in the takeout device 100 and labels are taken out one by one by blowing air from the air nozzles.

There arises a case where a position of attaching a label on a product needs to be changed. To cope with this situation, the label supplying section 200 is adapted to vertically move the vertical movable table 201 and also pivot this vertically movable table 201 about a horizontal axis.

For this purpose, two pairs of blocks 213 which are fixed on the surface of a frame 212 of the label supplying section 200 are provided, one pair being provided in the front portion of the frame 212 and the other pair being provided in the rear portion of the frame 212, each pair being in parallel to the plane of the labels. In each pair of the blocks 213, arcuate guide grooves 214 which are parts of a common circumferance are formed. An inclining plate 215 is provided above the frame 212 and this inclining plate 215 has four legs 216 projecting downwardly. Rollers 217 mounted on the four legs 216 are respectively received in the arcuate guide grooves 214 of the blocks 213 so that the inclining plate 215 can be inclined along the arcuate guide grooves 214.

For fixing the inclining plate 215 in an inclined state, a fixing plate 218 is fixedly secured to the rear end portion of the inclining plate 215. This fixing plate 218 is formed with a pair of arcuate fixing grooves 219 which are of the same radius of curvature as that of the guide grooves 214. A pair of fixing blocks 220 having a screw hole formed therein are provided in the fixing grooves 219. The fixing plate 218 is fixed by clamping it with a bracket 221 fixed on the frame 212 and a washer 222 and screwing a bolt into the screw holes of the fixing blocks 220. For inclining the inclining plate 215, a cam roller 223 is fixed to the inclining plate 215 in a manner to project laterally from a position which is slightly lower than the inclining plate 215. This cam roller 223 is received in a vertically extending cam groove 225 of a movable plate 224 which is reciprocably provided on the frame 212 in a direction toward and, away from the inclining plate 215 by means of a feed screw mechanism 226. By manually rotating the feed screw of the feed screw mechanism 226, the cam groove 225 is reciprocated and the inclining plate 215 thereby is inclined throgh the cam roller 223.

Vertically extending vertical movement guide bars 227 are fixed on the four corners of the inclining plate 215. These guide bars 227 are fitted slidably in guide blocks 228 fixed to the vertically movable table 201. A vertically movable portion of a jack screw 229 fixed on the lower surface of the inclining plate 215 is fixed on the lower surface of the vertically movable table 201. An operation handle 230 of the jack screw 229 is provided on the rear side of the fixing plate 218 which is integral with the inclining plate 215 and is connected to the jack screw 229 through a connection rod 231.

Accordingly, the vertically movable table 201 can be vertically moved relative to the inclining plate 215 by operating the jack screw 229. Thus, by combining the vertical movement of the vertical movable table 201 with inclination of the inclining plate 215, the support table on which labels are supported can be vertically moved relative to the frame 212 and also can be pivoted about a horizontal axis.

Figure 17:
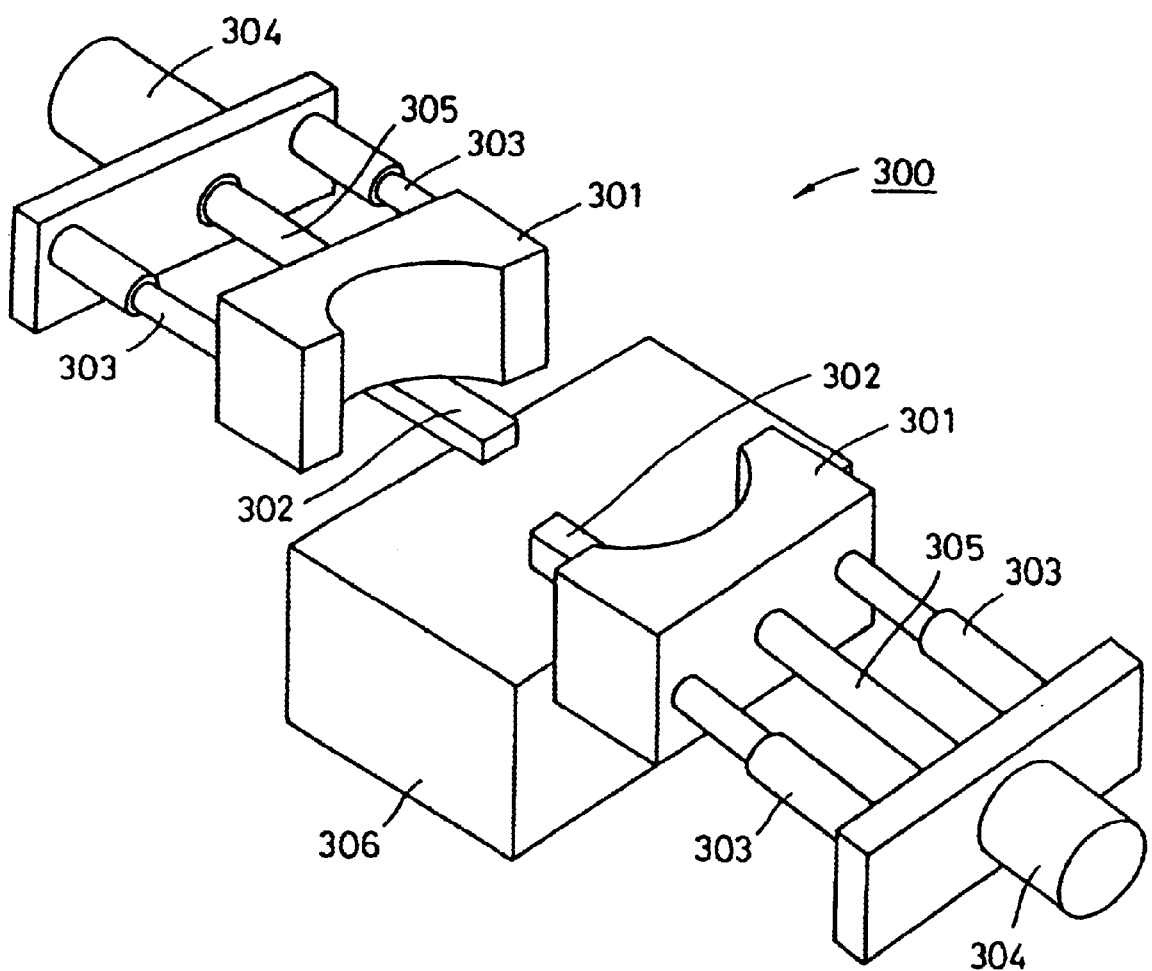
FIG. 17 is a schematic perspective view showing a bottom portion flash removing section of the blow molding apparatus.

In the blow molding apparatus 1 of the invention, a bottom portion flash removing unit 300 as shown in FIG. 17 is provided for removing flash in a bottom portion of a product which has been delivered to the first delivery position X1. The product delivered to this position X1 is temporarily placed with its bottom portion down.

This bottom portion flash removing unit 300 has a pair of split holding members 301 which hold a product on both sides of a bottom portion thereof and is disposed on both sides of a product in a direction crossing the direction of delivery of the product at right angle. A pair of push rods 302 are fixed to the lower portions of the split holding members 301 in such a manner that they project from the split holding members 301 slightly offset from the central axis of the product in opposite directions in the direction of delivery of the product. Each of the split holding members 301 is guided by a pair of guide members 303 fixed to the frame and extending in the direction normal to the direction of delivery of the product and is connected to a cylinder rod 305 of a reciprocating cylinder 304 which is provided between the pair of guide members 303 whereby the split holding members 302 are reciprocated toward and away from each other in the direction normal to the direction of delivery of the product. Further, a product mounting table 306 is provided on the product delivery line between the split holding members 301.

Accordingly, by holding a product which has been delivered to the first delivery position X1 by the pair of arms 101 by the holding members 301 and abutting the push rods 302 against flash of the bottom portion of the product, twisting force about the central axis of the flash is imparted to the flash and the flash thereby is removed from the product. Thus, the product which has been removed of the flash in the bottom portion is placed on the product mounting table 306 with its bottom portion down.

Figure 18:
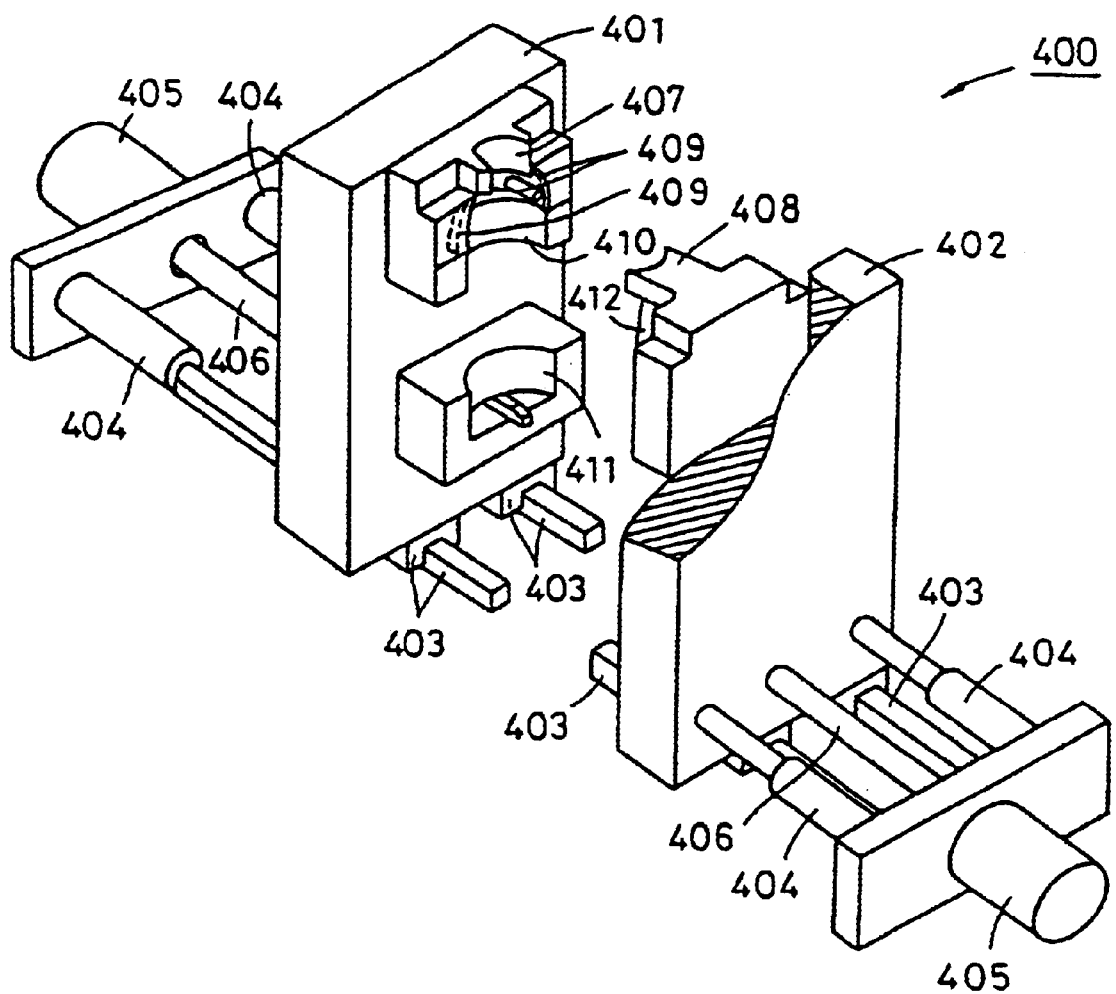
FIG. 18 is a schematic perspective view showing a flash removing section of the blow molding apparatus.

The blow molding apparatus 1 further includes a flash removing unit 400 as shown in FIG. 18 for removing flash from a product which is provided at the second delivery position X2.

This flash removing unit 400 has a pair of moving blocks 401 and 402 provided on both sides of a product in a direction normal to the direction of delivery of the product.

These moving blocks 401 an 402 can be moved along a pair of guide rails 403. The moving blocks 401 and 402 are guided by a pair of guide members 404 which extend in the direction normal to the direction of delivery of the product and is connected to a rod 406 of a reciprocating cylinder 405 which is provided between the guide members 404. Thus, the moving blocks 401 and 402 can move toward and away from each other in the direction normal to the direction of delivery of the product.

Screw portion flash removing members 407 and 408 are provided in the moving blocks 401 and 402 for removing flash in the upper portion of a product. The screw portion flash removing member 407 has a configuration which is larger than half of the shape of the screw portion of the product. The other screw portion flash removing member 408 which is opposed to the screw portion flash removing member 407 has a configuration which holds a side portion of the screw portion of the product without interfering with the screw portion flash removing member 407. On the moving block 401 is also provided a flash removing member 409 which includes an arcuate shaped portion which conforms to the shape of the upper side portion of the product and a portion which enters a hole of the product in which a handle of the product is to be mounted. A product holding member 410 of a shape which conforms to the shape of the side portion of the product is formed integrally with the flash removing member 407. A bottom portion holding member 411 having a shape which conforms to the shape of the bottom portion of the product is provided below the holding member 410 with an interval sufficient for preventing interference with the product holding section 116 of the arms 101.

In the moving block 402, a flash removing member 412 for holding the upper side portion of the product only is provided opposite to the flash removing member 409. There is no member in the moving block 402 that corresponds to the bottom portion holding member 411 of the moving block 401.

Accordingly, by moving the moving blocks 401 and 402 to hold from both sides a product which has been held by the product holding section 116 of the pair of arms 101 and has been delivered to the second delivery position X2 and pushing the screw portion flash removing member 407 and the flash removing member 409 over the center of the bottom while holding the product with the holding member 410, the bottom portion holding member 411, the screw portion flash removing member 408 and the flash removing member 412, flash of the screw portion, upper side portion and hole portion of the product can be removed.

Thus, the blow molded product is removed of flash in the state it is held by the product holding section 116 of the pair of arms 101 and thereby becomes a final product.

Figure 19:
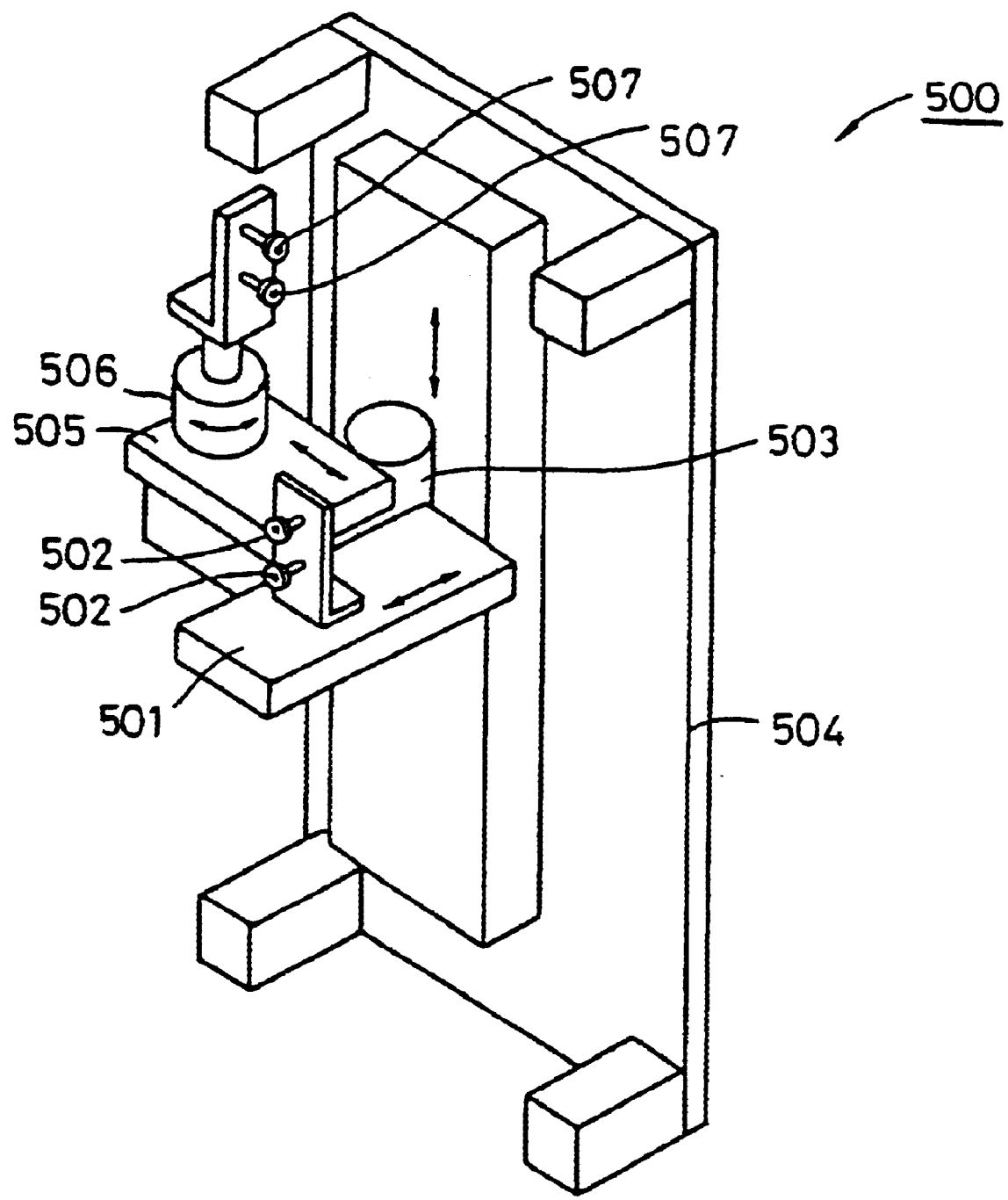
FIG. 19 is a schematic perspective view showing a receiving-turning-delivery section of the blow molding apparatus.

In a subsequent stage of the blow molding apparatus 1, a receiving-turning-delivery unit 500 as shown in FIG. 19 is provided for transferring the product which has been removed of flash to a next step with the direction of the product being changed. For example, in this blow molding apparatus 1, a product which has been delivered by the pair of arms 101 is changed in its direction by 90 degrees and is lowered from the height of the blow molding line to the height of a line of a next step.

The receiving-turning-delivery unit 500 has a first reciprocating table 501 having a guide mechanism and a reciprocating cylinder therein for delivering a product between the second delivery position X2 and the position X3 which is further downstream in the direction of delivery of the product. Vacuum suction pads 502 are secured to the first reciprocating table 501 for receiving a product from the downstream side in the direction of delivery of the product.

By advancing the first reciprocating table 501 and sucking and receiving by the sucction pads 502 the product which is held by the product holding section 116 of the pair of arms 101 and has been removed of flash in the second delivery position X2 and then withdrawing the first reciprocating table 501, the product is delivered to the downstream position X3.

At this downstream position X3, a vertically moving table 503 having a guide mechanism and a reciprocating cylinder therein is secured fixedly to a frame 504. On this vertically moving table 503 is provided a second reciprocating table 505 having a guide mechanism and a reciprocating cylinder therein which can reciprocate in a direction normal to the direction of delivery of the product. Vacuum suction pads 507 are provided on a rotary cylinder 506 which is mounted on the second reciprocating table 505.

Accordingly, the product which has been delivered by the first reciprocating table 501 to the downstream position X3 is received by the second reciprocating table 505 by elevating the vertically moving table 503 and advancing the second reciprocating table 505 to suck the side portion of the product with the vacuum suction pads 507. After receiving the product, the second reciprocating table 505 is withdrawn from the product delivery line.

Then, the direction of the product is changed by 90 degrees by rotating the rotary cylinder 506 by 90 degrees and then the vertically moving table 503 is lowered to the height of the line of a next step. Then, the product is transferred to an unillustrated conveyer belt and is released from suction by the vacuum suction pads 507 whereby the product can be delivered out on the conveyer belt. Since the product is controlled in a predetermined posture until it is transferred to the conveyer belt, the product can be delivered out in a sufficiently stable state and processing in the next step thereby is facilitated.

Description will now be made about the blow molding method of the invention until completion of delivery of a product as well as operation of the blow molding apparatus 1. The following description will be made with respect to blow molding of a product in the stage A and taking out and delivering of the product after blow molding with reference to to FIGS. 20 and 21.

In the blow molding apparatus 1, a label must be attached to a split mold before starting blow molding. For this purpose, as shown in FIG. 20A, the pair of arms 101 of the takeout device 100 are moved on the downstream side to position the product holding section 115 at the first delivery position X1 and thereby cause the label holding units 119 to oppose the label supplying sections 200.

Then, the arms 101 are opened to the label takeout state by pivoting the pivoting arm 112 by operation of the servo motor 114 of the opening and closing mechanism 110 to cause labels of the label takeout frames 203 of the label supplying sections 200 to be sucked by vacuum suction and then the arms 101 are closed to the intermediate state to take out one label each from each of the label takeout frames 203.

Thereafter, as shown in FIG. 20B, the arms 101 are moved to the upstream side to cause the labels to oppose the opened split mold members 34 and 34a and, as shown in FIG. 20C, the arms 101 are opened to the label attaching state and thereby to attach the labels to the inside surface of the split mold members 34 and 34a.

In the continuous blow molding, a product will remain in the center if the split mold members 34 and 34a are kept open and, therefore, after attaching the labels to the split mold members 34 and 34a in the label attaching state in which the arms 101 are opened, the arms 101 are closed as shown in FIG. 20D to the product holding state thereby holding the product in the center by the product holding section 115.

Figure 21A:
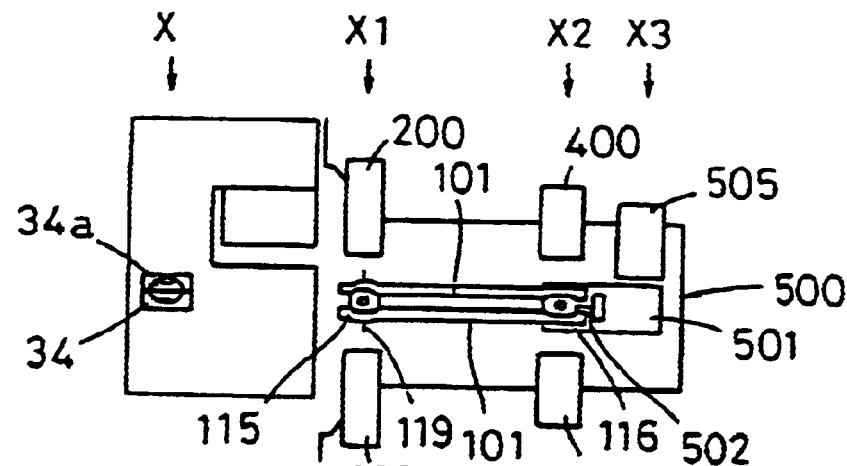
FIGS. 21A, 21B, 21C and 21D are views illustrative of a latter half of the product delivery and label attaching processes in the embodiment of the blow molding method.
Figure 21B:
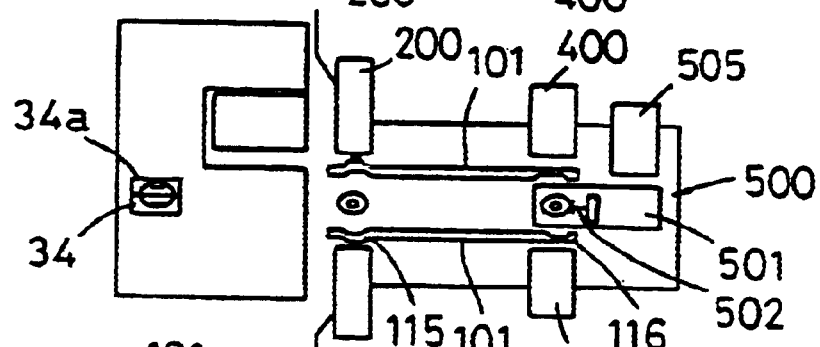

Then, the arms 101 are moved to the downstream side and withdrawn at the start of the blow molding operation. In the continuous blow molding operation, as shown in FIG. 21A, the product is moved to the first delivery position X1 where flash of the bottom portion of the product is removed by the bottom flash removing unit 300 while the product is held by the arms 101. Then, as shown in FIG. 21B, the arms 101 are opened to the product releasing state to thereby place the product on the product mounting table 306 and thereafter the arms are opened to the label takeout state to thereby take out labels.

Simultaneously with this movement of the arms 101 to the downstream side, in the blow molding unit 10, the split mold members 34 and 34a to which the labels are attached are closed and blow molding is performed. Upon completion of blow molding, opening of the arms 101 is resumed again (see FIGS. 20A, 20B, 21A and 21B).

After receiving labels by vacuum suction, the arms 101 which are closed to the intermediate state are moved to the upstream side again as shown in FIG. 20B to enter between the split mold members 34 and 34a and the product. Then, after attaching the labels to the inside of the split mold members 34 and 34a in the label attaching state as shown in FIG. 20C, the arms 101 are closed to the product holding state to hold the product placed in the center with the product holding section 115 and, simultaneously therewith, to hold the product placed on the product mounting table 306 at the first delivery position X1 with the product holding section 116.

The arms 101 are then moved to the downstream side as shown in FIG. 21A with the product holding sections 115 and 116 holding the products. The product at the first delivery position X1 thereby is moved to the second delivery position X2 where flash of the product is removed by the flash removing unit 400 and then the product is received by the vacuum suction pads 502 of the first reciprocating table 501 of the receiving-turning-delivery unit 500.

Simultaneously therewith, the product delivered from the product discharging position X is removed of flash in the bottom portion of the product as was already described.

Then, as shown in FIG. 21B, the arms 101 are opened to the product releasing state to release the products held by the product holding sections 115 and 116.

Thereupon, the product at the first delivery position X1 is placed on the product mounting table 306 as was already explained.

Figure 21C:
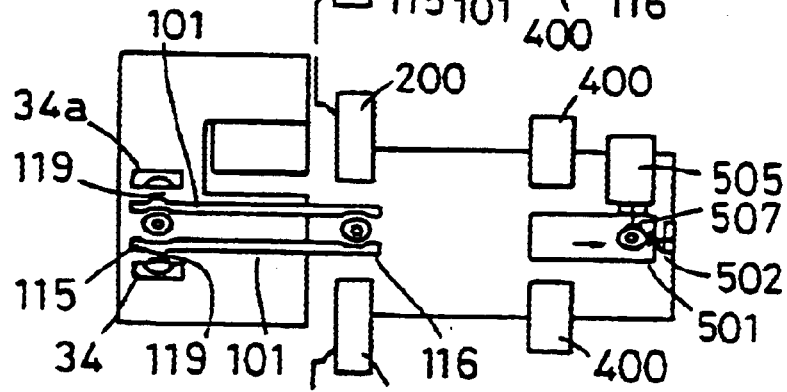

On the other hand, the product at the second delivery position X2 is moved, as shown in FIG. 21C, to the downstream position X3 by moving the first reciprocating table 501 to the downstream side. The second reciprocating table 505 is then advanced to receive the product by vacuum suction by the vacuum suction pads 507. The product is then released from suction by the vacuum suction pads 502 and the product thereby is transferred to the second reciprocating table 505.

Figure 21D:
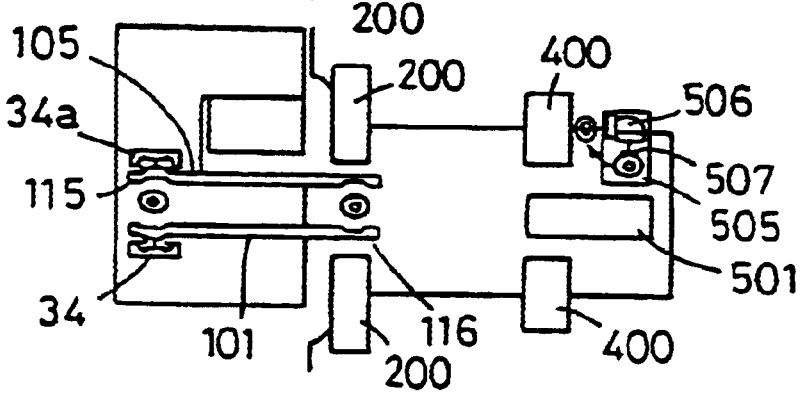

As shown in FIG. 21D, after the second reciprocating table 505 is withdrawn, the vacuum suction pads 507 are rotated by 90 degrees by rotating the rotary cylinder 506 and the vertically movable table 503 is lowered to transfer the product to the conveyer belt. Then the product is released from suction by the vacuum suction pads 507 to complete the delivery.

By repeating this series of operations, blow molding and delivery of the product are continuously performed.

In the foregoing description, description was made about a case where blow molding is performed with only the single stage A. In the case where, as was already been described, blow molding is made in the order of stages A, B, C and D by using the four stages A, B, C and D and the products are delivered from the stages A and C and the stages B and D, delivery of the product may be made by utilizing time for two cycles of blow molding (i.e., time after blow molding A and until blow molding C) and so sufficient time can be secured.

As described above, according to the blow molding apparatus 1 and the blow molding method using this apparatus, taking out of a product and attaching of a label can be made simultaneously by the pair of opening and closing arms 101 and, therefore, a complex device such as two sets of robots is unnecessary and necessary operations can be completed in a relatively short period of time. Accordingly, blow molding can be achieved by a shortened cycle time and a structure for blow molding can be simplified.

According to the takeout device 100, the opening and closing arms 101 can be opened and closed to respective opened and closed states by controlling the pivoting angle of the pivoting arm 112. The respective opened and closed states can therefore be realized promptly and accurately. Further, since the servo motor 107 is used to drive the pivoting arm 112, there is no problem of spoiling of a product caused by leakage of hydraulic oil in case a hydraulic cylinder is used.

Further, according to the takeout device 100, the product holding sections 115 and 116 of the pair of arms 101 are made detachable and, therefore, in a case where the shape and size of a product are changed, this situation can be simply coped with by replacing the product holding sections 116 and 116 to those which conform to the changed shape and size. Thus, the apparatus can be adapted easily to a small scale production of various types of products. In a case where a plurality of products should be taken out simultaneously by using a multiple parison type split mold, this situation can be coped with easily by changing the size and shape of the product holding sections 115 and 116.

Since the product holding section 116 of the arms 101 in the takeout device 100 has a lower height and the the product is held in the middle portion, flash of the product can be removed while the product is held.

According to the blow molding apparatus 1, the label supplying section 200 is so constructed that the vertically movable table 201 is vertically moved to adjust the vertical position of the label supplying section 200 relative to the split mold members and the inclining table 215 is inclined about a horizontal axis which is parallel to the direction normal to the direction of delivery of a product to adjust the pivoted position of the label supplying section 200. Accordingly, the label supplying section 200 can attach a label to the split mold members in a desired label attaching state (position and angle of attachment).

According to the blow molding apparatus 1, the bottom portion flash removing unit 300 is provided at the first delivery position X1 for removing flash of the bottom portion of the product and thereby enable the product to be placed in position with its bottom portion down and the pair of push rods 302 project slightly offset from the central axis of the product in opposite directions in the direction of delivery of the product and, therefore, flash of the bottom portion of the product can be removed easily and the product can be temporarily placed in a stable state at the first delivery position X1 with its bottom down.

According to the blow molding apparatus 1, the flash removing unit 400 is provided at the second delivery position X2 for removing flash of the upper and side portions of the delivered product in which the screw portion flash removing members 407 and 408 remove flash by holding the screw portion at the upper end portion of the product and the flash removing member 409 removes flash on the side portion of the product by holding the side portion of the product are provided. Accordingly, by moving the moving blocks 401 and 402 to clamp the product, flash in the screw portion and the side portion of the product can be easily removed.

Further, according to the blow molding apparatus 1, the receiving-turning-delivery unit 500 is provided in which the product is received from the second delivery position X2 by the vacuum suction pads 502 of the first reciprocating table 501, the product is then transferred to the vacuum suction pads 507 of the second reciprocating table 505, the direction of the product is changed by rotating the vacuum suction pads 507 by the rotary cylinder 506 and the second reciprocating table 505 with the product is lowered to a next step. Accordingly, the product can be delivered in a constantly controlled posture so that it can be delivered out in a state which is suited for processing in the next step.

What is claimed is:

1. A blow molding method comprising steps of moving a split mold to a parison receiving position where a parison is supplied and receiving a parison, closing the split mold, performing blow molding at a blow molding position, and opening the split mold at a product discharge position and thereby discharging a product, said method further comprising steps of:

sequentially reciprocating, in a direction y, each split mold in trains of split molds provided opposed to each other across the parison receiving position to and from a position opposed to the parison receiving position; and sequentially reciprocating, in a direction x crossing the direction y in the same vertical plane, the split mold disposed at the position where the split mold is opposed to the parison receiving position to and from the parison receiving position for performing blow molding.

2. A blow molding method as defined in claim 1 wherein the direction of reciprocation of each split mold in the trains of the split molds to and from the position opposed to the parison receiving position crosses, at right angle, the direction of reciprocation of the split mold disposed at the position opposed to the parison receiving position to and from the parison receiving position.

3. A blow molding method as defined by claim 1 wherein a plurality of parisons are supplied simultaneously at the parison receiving position to each split mold which are adapted to receive the plurality of parisons.

4. A blow molding apparatus in which a split mold is moved to a parison receiving position where a parison is supplied, is closed for performing blow molding at a blow molding position and is opened at a product discharging position for discharging a product, said apparatus comprising:

trains of split molds provided opposed to each other across the parison receiving position;

a first reciprocating section which sequentially reciprocates, in a direction y, each split in the trains of the split molds to and from a position opposed to the parison receiving position;

a second reciprocating section which sequentially reciprocates each split mold of the trains of the split molds to and from the parison receiving position in a direction x crossing the direction y in the same vertical plane of movement of the first reciprocating section; and a reciprocating control section which controls the first reciprocating section and the second reciprocating section for performing blow molding by reciprocating each split mold to and from the parison receiving position and to and from the product discharging position.

5. A blow molding apparatus as defined in claim 4 wherein the direction of movement of the first reciprocating section crosses the direction of movement of the second reciprocating section at right angle.

6. A blow molding apparatus in which a split mold is moved to a parison receiving position where a parison is supplied, is closed for performing blow molding at a blow molding position and is opened at a product discharging position for discharging product, said apparatus comprising:

trains of split molds provided opposed to each other across the parison receiving position;

a first reciprocating section which sequentially reciprocates, each split in the trains of the split molds to and from a position opposed to the parison receiving position;

a second reciprocating section which sequentially reciprocates each split mold of the trains of the split molds to and from the parison receiving position in a direction crossing the direction of movement of the first reciprocating section; and a reciprocating control section which controls the first reciprocating section and the second reciprocating section for performing blow molding by reciprocating each split mold to and from the parison receiving position and to and from the product discharging position, wherein the first reciprocating section and the second reciprocating section each comprise a moving table which is constructed in the form of a box made by welding plates.

* * * * *